(12) United States Patent
Behan et al.

(10) Patent No.: US 9,917,299 B2
(45) Date of Patent: Mar. 13, 2018

(54) METHOD AND MATERIAL FOR LITHIUM ION BATTERY ANODES

(71) Applicant: Corning Incorporated, Corning, NY (US)

(72) Inventors: Francis Martin Behan, Corning, NY (US); Indrajit Dutta, Horseheads, NY (US); Shawn Michael O'Malley, Horseheads, NY (US); Vitor Marino Schneider, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/528,978

(22) PCT Filed: Nov. 24, 2015

(86) PCT No.: PCT/US2015/062373
§ 371 (c)(1),
(2) Date: May 23, 2017

(87) PCT Pub. No.: WO2016/085953
PCT Pub. Date: Jun. 2, 2016

(65) Prior Publication Data
US 2017/0271651 A1    Sep. 21, 2017

Related U.S. Application Data

(60) Provisional application No. 62/084,084, filed on Nov. 25, 2014.

(51) Int. Cl.
*H01M 10/0562*    (2010.01)
*H01M 4/134*    (2010.01)
(Continued)

(52) U.S. Cl.
CPC ......... *H01M 4/134* (2013.01); *H01M 4/1395* (2013.01); *H01M 4/36* (2013.01); *H01M 4/48* (2013.01); *H01M 4/602* (2013.01)

(58) Field of Classification Search
CPC ...... H01M 4/134; H01M 4/36; H01M 4/1395; H01M 4/602; H01M 4/48
(Continued)

(56) References Cited

U.S. PATENT DOCUMENTS

| 2005/0136330 A1 | 3/2005 | Mao et al. |
| 2009/0130562 A1 | 5/2009 | Mao et al. |

(Continued)

FOREIGN PATENT DOCUMENTS

| CN | 102969489 A | 3/2013 |
| EP | 2693533 A1 | 2/2014 |
| WO | 2015157538 A1 | 10/2015 |

OTHER PUBLICATIONS

Xuejia Feng et al. "Facile approach to SiOx/Si/C composite anode material from bulk SiO for lithium ion batteries", Physical Chemistry Chemical Physics, vol. 15, No. 34, Jun. 24, 2013, pp. 14420-14426, ISSN: 1463-9076.*
(Continued)

*Primary Examiner* — Gary Harris

(57) ABSTRACT

Highly porous synergistic combinations of silicon and carbon materials are provided, along with articles that incorporate such materials and processes for producing the materials. The compositions have novel properties and provide significant improvements in Coulombic efficiency, dilithiation capacity, and cycle life when used as anode materials in lithium battery cells including solid state batteries.

44 Claims, 12 Drawing Sheets

(51) Int. Cl.
  *H01M 4/36*    (2006.01)
  *H01M 4/48*    (2010.01)
  *H01M 4/60*    (2006.01)
  *H01M 4/1395*  (2010.01)

(58) Field of Classification Search
  USPC .......................................................... 429/322
  See application file for complete search history.

(56) References Cited

U.S. PATENT DOCUMENTS

| | | |
|---|---|---|
| 2012/0052656 A1 | 3/2012 | Bellman et al. |
| 2013/0149549 A1 | 6/2013 | Borrelli et al. |
| 2013/0189575 A1 | 7/2013 | Anguchamy et al. |
| 2013/0220211 A1 | 8/2013 | Dutta et al. |
| 2014/0030597 A1 | 1/2014 | Jung et al. |
| 2014/0057176 A1 | 2/2014 | Park et al. |
| 2015/0291470 A1 | 10/2015 | Borrelli et al. |
| 2017/0033353 A1 | 2/2017 | Behan et al. |

OTHER PUBLICATIONS

Mattevi, Cecilia, Hokwon Kim, and Manish Chhowalla. "A review of chemical vapour deposition of graphene on copper." Journal of Materials Chemistry 21.10 (2011): 3324-3334.

El-Kady, Maher F., et al. "Laser scribing of high-performance and flexible graphene-based electrochemical capacitors." Science 335. 6074 (2012): 1326-1330.

Feng, Xuejiao, et al. "Facile approach to SiO x/Si/C composite anode material from bulk SiO for lithium ion batteries." Physical Chemistry Chemical Physics 15.34 (2013): 14420-14426.

Wu, Hui, et al. "Stable cycling of double-walled silicon nanotube battery anodes through solid-electrolyte interphase control." Nature nanotechnology 7.5 (2012): 310-315.

International Search Report and Written Opinion of the International Searching Authority; PCT/US2015/062373 dated Feb. 12, 2016.

Kim Yong Seok, et al. "Silicon-Rich Carbon Hybrid Nanofibers from Water-Based Spinning: The Synergy Between Silicon and Carbon for Li-ion Battery Anode Application." ChemElectroChem 1.1 (2014): 220-226.

Nie, Mengyun, et al. "Silicon solid electrolyte interphase (SEI) of lithium ion battery characterized by microscopy and spectroscopy." The Journal of Physical Chemistry C 117.26 (2013): 13403-13412.

Favors, Zachary, et al. "Scalable synthesis of nano-silicon from beach sand for long cycle life Li-ion batteries." Scientific reports 4 (2014): 5623.

Zhao, Xin, et al. "Composites of graphene and encapsulated silicon for practically viable high-performance lithium-ion batteries." Nano Research 7.10 (2014): 1429-1438.

\* cited by examiner

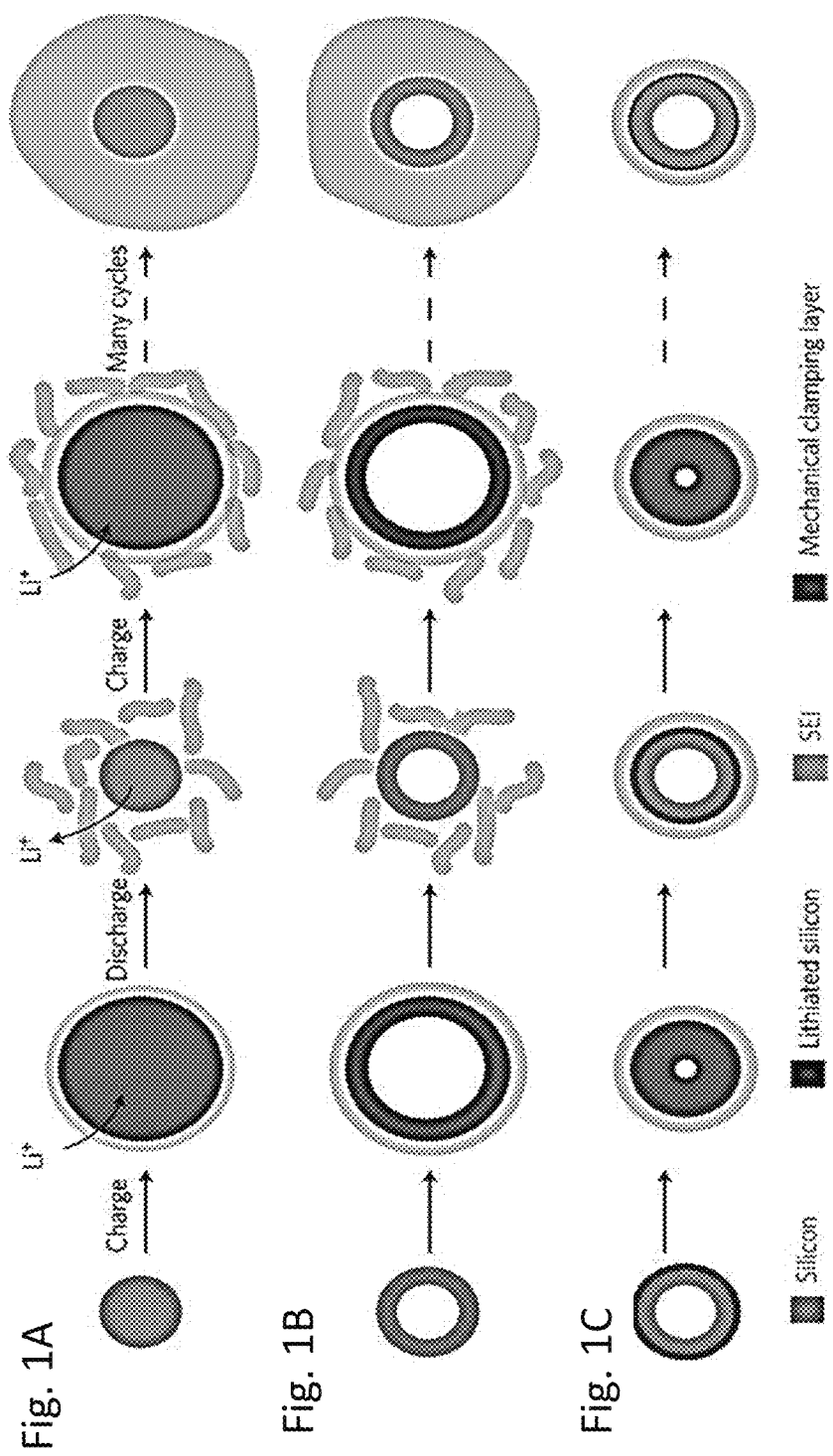

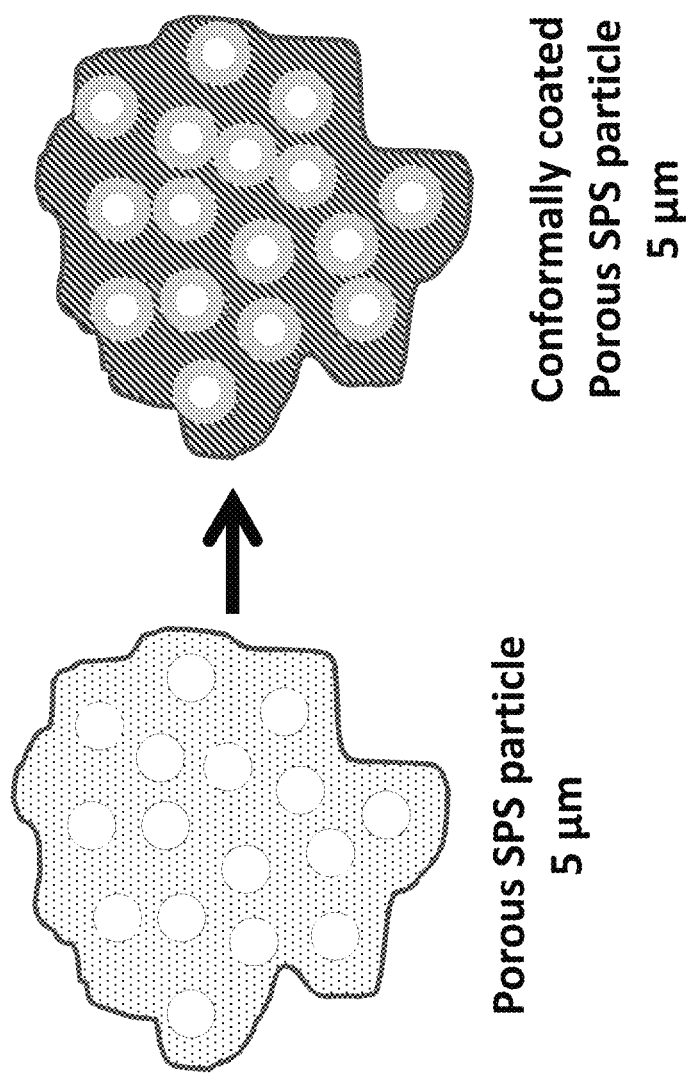

METHOD AND MATERIAL FOR LITHIUM ION BATTERY ANODES

This application claims the benefit of priority under 35 U.S.C. § 365 of International Patent Application Serial No. PCT/US15/62373 filed on Nov. 24, 2015 designating the United States of America, which claims the benefit of priority to U.S. Provisional Application Ser. No. 62/084,084 filed on Nov. 25, 2014 the content of which are relied upon and incorporated herein by reference in their entirety.

FIELD

Embodiments generally relate to highly porous compositions for use as, among other things, as anode materials in lithium ion batteries, and methods of producing such compositions. More particularly, embodiments relate to synergistic combinations of silicon and carbon materials to produce anodes with large energy storage and extended life cycles, devices incorporating these materials, and methods of producing such.

BACKGROUND

Lithium ion batteries represent an important class of rechargeable energy storage in which lithium ions move from the negative electrode to the positive electrode during discharge. First proposed in 1972, lithium ion batteries have become widely used in the portable consumer electronics and have been extended into electric vehicles as well. Lithium ion batteries are popular for several reasons including their light weight when compared to most other rechargeable batteries and the fact that they have high open-circuit voltage, low self-discharge rate, reduced toxicity and lack battery memory effect.

In a lithium battery under load, the lithium ions stored on the anode migrate from the anode through an electrolyte medium to the cathode creating an electrical current. During the charging process the lithium ions migrate back onto the anode. Currently, graphite is often used as the anode material. While not necessarily the optimal anode material, graphite's high availability and low cost currently make it an attractive solution. When carbon is used as the anode, and $LiCoO_2$ as the cathode, the reaction on a Li-ion cell is given as: $C+LiCoO_2 \leftrightarrow LiC_6+Li_{0.5}CoO_2$. The reactions at each electrode are given as:

At the cathode: $LiCoO_2-Li^+-e- \leftrightarrow Li_{0.5}CoO_2 \Rightarrow 143$ mAh/g At the anode: $6C+Li^++e- \leftrightarrow LiC_6 \Rightarrow 372$ mAh/g One alternative to graphite as an anode material is silicon. The Li—Si anode system has one of the highest possible gravimetric capacities of all the elements. Further, unlike carbon based anode systems, silicon does not suffer from solvent co-intercalation breakdown. Silicon shows these advantageous properties due to the chemical structure of the Li—Si system—a single silicon atom is able to bind to 3.75 lithium ions, whereas it takes 6 carbon atoms to retain a single lithium ion. When silicon as an anode material is compared to graphitic carbon, the theoretical capacities differ by an order of magnitude. For a range of x from 0 to 3.75, the theoretical specific capacity of pure silicon is 3580 mAh/g, far greater than the theoretical capacity of 372 mAh/g for graphitic carbon. The full reaction is written as: $4Si+15\ Li++15\ e^- \leftrightarrow Li_{15}Si_4 \Rightarrow 3580$ mAh/g.

While the above-noted properties seem to make silicon an ideal anode material, one consequence of silicon's enhanced lithium ion interaction is a large increase in volume dilation (>300%). This volume dilation results in the silicon anode structure being subjected to high stress levels and mechanical breakdown. Additionally the breakdown can occur because the anode loses contact with the electrode due to detachment, resulting in heterogeneous current density across the electrode. This breakdown means that traditional silicon anodes are unable to go through the multiple charge/discharge cycles necessary for commercialization. Hence, a critical unmet need for the use of silicon as a viable anode material is find a way to structurally stabilize it against multiple volume expansions.

SUMMARY

Embodiments described herein are directed to forming novel products utilizing metallothermic reduction processes with powder and soot compositions comprising both single and multiple elements, and methods of forming such products.

A first aspect comprises a composite material comprising a core material and a coating material coating at least part of the outer surface of the core material, the core material comprising an outer surface and a porous core, wherein the porous core of the core material has average pore size of from about 50 to about 1350 Å; and particles having a surface area of from about 10 m²/g to about 250 m²/g; wherein the particles comprise $SiO_x$, wherein x is from 1-2, from about 3 wt % to about 40 wt %; crystalline silicon from about 60 wt % to about 97 wt %; wherein the ratio of crystalline silicon:$SiO_x$ is from about 1.5:1 to about 30:1. In some embodiments, the core material further comprises from greater than 0 wt % to about 25 wt % crystalline $Mg_2SiO_4$, from greater than 0 wt % to about 5 wt % MgO, or from greater than 0 wt % to about 10 wt % MgO.

In some embodiments, the core material is in the form of particles with an average diameter along the longest axis of from about 1 μm to about 10 μm. In some embodiments, the core material is in the form of sintered porous particles comprising subparticles comprising $SiO_x$ and crystalline silicon. In some embodiments, the subparticles have an average size along the longest axis of from about 10 nm to about 500 nm.

In some embodiments, the coating material coats less than 30%, 40%, 50%, 60%, 70%, 80%, or 90% of the surface area of porous core of the core material and coats at least about 30%, 40%, 50%, 60%, 70%, 80%, or 90% of the outer surface of the core material. In some embodiments, the coating material comprises an organic material. In some embodiments, the coating material is conductive, semiconductive, or non-conductive. In some embodiments, the organic material comprises an organic coating chemically bonded to the core material, for example, a polymer, such as PEO epoxy, PEG epoxy, or polyaniline. In some embodiments, the organic material comprises carbon in the form of activated carbon, amorphous carbon, graphene, graphite, mesoporous carbon, diamond-like carbon, nanocrystalline diamond, nanotubes, fullerenes, nanobuds, nanofibers, glassy carbon, and combinations thereof. In some embodiments, the organic coating material further comprises an inorganic material present from greater than 0 wt % to about 10 wt %, however typically they are present in amounts less than 3 total combined wt %. In some embodiments, the organic coating material further comprises a pre-coating material that improves adhesion of the coating material.

In some embodiments, the coating material comprises an inorganic material, for example, gold, silver, aluminum, copper, and other transition metals, oxides, including alumina, tungsten oxide, aluminum zinc oxide, indium tin oxide and other TCOs, and other inorganic materials such as inorganic polymers such as polysilanes.

In some embodiments, the coating material has a thickness from about 1 nm to about 5 µm. In some embodiments, the coating layer thickness is from about 2 nm to about 5 µm, about 10 nm to about 3 µm, about 10 nm to about 1 µm, about 10 nm to about 800 nm, about 10 nm to about 500 nm, about 5 nm to about 5 µm, about 5 nm to about 3 µm, about 5 nm to about 1 µm, about 5 nm to about 800 nm, about 80 nm to about 5 µm, about 80 nm to about 3 µm, about 80 nm to about 1 µm, about 1 µm to about 5 µm, about 1 µm to about 3 µm, or about 3 µm to about 5 µm. In some embodiments, the mass ratio of the core material to the coating material is from about 1000:1 to 100:1 to 10:1 to 1:10, 8:1 to 1:8, 5:1 to 1:5, or 2:1 to 1:2.

A second aspect comprises an anode comprising any of the composite materials described herein, wherein the anode has a specific capacity of about 20% of the initial value or greater after 100 cycles at 0.2 C discharge rate. In some embodiments, the anode has a gravimetric capacity of 400 mAh/g or greater after 100 cycles at 0.2 C discharge rate. In some embodiments, the anode has a first cycle coulombic efficiency of 45% of the initial value or greater. In some embodiments, the anode further comprises carbon, and the carbon may be in the form of graphite, graphene, activated carbon, or carbon nanotubes.

A third embodiment comprises a method of making the materials described herein, wherein the method comprises: a. subjecting a silica precursor to a metallothermic process; b. removing reaction by-products to give a $SiO_x$-silicon core material; c. subjecting the core material to a coating material, wherein the coating material is conductive, semiconductive, or non-conductive. In some embodiments, the subjecting a silica precursor to a metallothermic process comprises heating the silica precursor to a temperature of greater than 400° C. for more than 2 hours while in the presence of magnesium. In some embodiments, the subjecting comprises heating to a temperature of greater than 400° C. for more than 2 hours and subsequently, heating to a temperature of greater than 600° C. for more than 2 hours. In some embodiments, the silica precursor comprises a glass soot, glass powder or glass fiber. In some embodiments, the silica precursor comprises a glass soot or glass powder having an average size along the longest axis of from about 10 nm to about 1 µm.

In some embodiments of the process, the coating material comprises an organic material. In some embodiments, the organic material is chemically bonded to the core material. In some embodiments, the coating material comprises a carbon precursor. In some embodiments, the organic coating further comprises an inorganic material present from greater than 0 wt % to about 10 wt %, however typically they are present in amounts less than 3 total combined wt %.

In some embodiments of the process, the process further comprises the step of pre-coating the core material with a material that improves adhesion of the coating material.

In some embodiments of the process, the coating material comprises an inorganic material, for example, gold, silver, aluminum, copper, and other transition metals, oxides, including alumina, tungsten oxide, aluminum zinc oxide, indium tin oxide and other TCOs, and other inorganic materials such as inorganic polymers such as polysilanes.

In some embodiments of the process, the coating material has a thickness from about 1 nm to about 5 µm. In some embodiments, the coating layer thickness is about 2 nm to about 5 µm, about 10 nm to about 3 µm, about 10 nm to about 1 µm, about 10 nm to about 800 nm, about 10 nm to about 500 nm, about 5 nm to about 5 µm, about 5 nm to about 3 µm, about 5 nm to about 1 µm, about 5 nm to about 800 nm, about 80 nm to about 5 µm, about 80 nm to about 3 µm, about 80 nm to about 1 µm, about 1 µm to about 5 µm, about 1 µm to about 3 µm, or about 3 µm to about 5 µm. In some embodiments, the mass ratio of the core material to the coating material is from about 1000:1 to 100:1 to 10:1 to 1:10, 8:1 to 1:8, 5:1 to 1:5, or 2:1 to 1:2.

Another aspect comprises a method of making a composite material described herein, wherein the method comprises: a. combining a silica precursor and magnesium in a ratio of from about 0.5:1 to about 2:1 to form a mixture; b. heating the mixture to a temperature greater than about 650° C. and less than 1000° C.; wherein the heating is done at a ramp rate from about 0.5 C°/min to about 50° C./min to form a core material; and c. coating the core material with a carbon precursor and heating the core material and carbon precursor to a temperature sufficient to carbonize the carbon precursor. In some embodiments, the method further comprises removing reaction by-products of step b. by acid etching the silica-silicon hybrid with an organic acid having a concentration of from about 0.3 M or greater. In some embodiments, the heating in step c. comprises heating to a temperature greater than 600° C.

BRIEF DESCRIPTION OF THE DRAWINGS

The following detailed description of specific embodiments of the present disclosure can be best understood when read in conjunction with the following drawings, where like structure is indicated with like reference numerals.

FIGS. 1A-1C compare the embodiments described herein with alternative embodiments when used as anodes in a lithium battery (from Wu et al. 7 Nat. Nanotech. 310-315 (2012), hereby incorporated by reference). FIG. 1A describes a solid silicon structure that is lithiated and subsequently forms a solid electrolyte interphase layer (SEI) on the surface. This SEI is formed due to reaction of the electrolyte and Li-salt used in the electrolyte on the Si surface. A solid silicon particle expands upon lithiation. A thin layer of SEI forms in this lithiated and expanded state. During delithiation, the silicon structures shrink, and the SEI can break down into separate pieces, exposing fresh silicon surface to the electrolyte. With repeated cycles, new SEI is formed on the newly exposed silicon surfaces, resulting in the accumulation of a very thick and unstable SEI layer on the outside of the solid silicon surface. The SEI layer comprises of organic and inorganic lithium salts which represent a loss of active lithium ions. Similarly, as shown in FIG. 1B, when nanoscale, porous silicon structures are used, a SEI grows outside the silicon because of exposed Si surface. FIG. 1C provides an example of the embodiments described herein. In FIG. 1C, a porous silicon structure is combined with a mechanical constraining layer that coats or covers at least part of the surface of the silicon. The constraining layer prevents the silicon from expanding during lithiation, as well as protects the bare Si surface, which prevents the repeated formation of SEI layers that results in the buildup of SEI on the anode as shown in FIGS. 1A and 1B.

FIG. 2A is at 500× magnification (the white bar is 10 µm) and FIG. 2B is at 3000× magnification (the bar is ~2 µm).

FIG. 4A is at 5000× (white line is 2 µm), FIG. 4B is at 3000× (white line is 2 µm), FIG. 4C is at 3000× (white line is 2 µm), and FIG. 4D is at 10,000× (white line is 1 µm).

FIG. 8 is a 2D illustration of a 5 micron SPS particle before (image on left) and after conformal coating (image on right) to yield a hybrid SPS particle. The pores of the SPS particle still retain porosity even after conformal coating.

FIG. 9A shows a complete, coated porous particle while FIG. 9B shows a magnified image of an embodied carbon coating. The wet sugar coating was applied to 5 µm porous silicon particles (stable porous silicon, SPS) in FIG. 9A to demonstrate the coating thickness when a sucrose-glucose-graphene oxide-sulfuric acid solution is applied and subsequently carbonized in an argon oven.

DETAILED DESCRIPTION

Figure 2B:
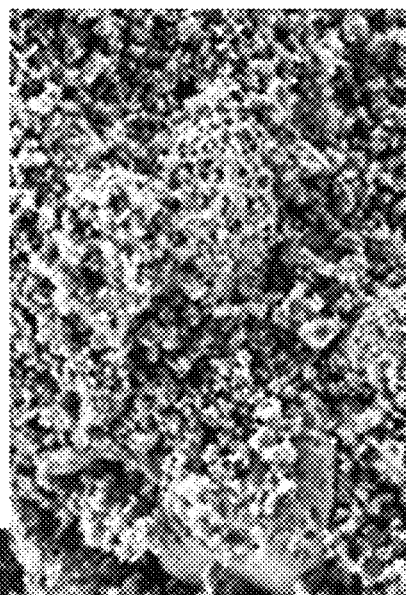
FIGS. 2A and 2B are Scanning Electron Microscope (SEM) images of conformal carbon coatings on stable porous silicon ("SPS") as made using a sucrose-based aqueous coating to form the carbon.

The following description is provided as an enabling teaching and can be understood more readily by reference to the following detailed description, drawings, examples, and claims, and their previous and following description. To this end, those skilled in the relevant art will recognize and appreciate that many changes can be made to the various aspects described herein, while still obtaining the beneficial results. It will also be apparent that some of the desired benefits of the present disclosure can be obtained by selecting some of the features without utilizing other features. Accordingly, those who work in the art will recognize that many modifications and adaptations are possible and can even be desirable in certain circumstances and are a part of the present disclosure. Thus, the following description is provided as illustrative of embodiments and not in limitation thereof. Further, it is to be understood that this disclosure is not limited to the specific compositions, articles, devices, and methods disclosed unless otherwise specified, as such can, of course, vary. It is also to be understood that the terminology used herein is for the purpose of describing particular aspects only and is not intended to be limiting.

Disclosed are materials, compounds, compositions, and components that can be used for, can be used in conjunction with, can be used in preparation for, or are embodiments of the disclosed methods and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

In this specification and in the claims which follow, reference will be made to a number of terms which shall be defined to have the following meanings:

"Include," "includes," or like terms means encompassing but not limited to, that is, inclusive and not exclusive.

The term "about" references all terms in the range unless otherwise stated. For example, about 1, 2, or 3 is equivalent to about 1, about 2, or about 3, and further comprises from about 1-3, from about 1-2, and from about 2-3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

The indefinite article "a" or "an" and its corresponding definite article "the" as used herein means at least one, or one or more, unless specified otherwise.

"Porosity," as used herein, is a measure of the void space in the crystalline structure. Porosity may be measured using techniques such as the Barrett, Joyner and Halenda method (BJH) and the Brunauer, Emmer and Teller method (BET) and Mercury Porosimetry, which are standard methods to determine the surface area, pore size and pore size distribution and bulk density in materials.

"Metallothermic," as used herein, refers to a gas/solid displacement reaction wherein at least one solid oxide compound is at least partially converted to the base element or an alternative compound comprising the base element via chemical reaction. In some embodiments, the reaction is done in the gas phase with the gas comprising magnesium or calcium. However, in some cases, the metallothermic reduction is done via an electronically-mediated reaction.

"Powders," as used herein, refers to finely dispersed solid particles with an average diameter along their shortest dimension of from about 10 nm to about 500 μm.

"Soot," as used herein, refers to silica-containing particles made by flame combustion of silica precursors. Soots are a subset of powders that 1) comprise silica and 2) are formed via specific process and have unique properties, such as good particle size and shape homogeneity, high surface areas, and controllable compositional formulations.

Materials

The current disclosure expands the scope of materials available for the manufacturing of components for electrochemical processes. As stated above, there is continued need for improvements in electrical storage. Current lithium ion batteries ("LIB") use carbon as the anode material. For decades, silicon has been viewed as an attractive alternative material relative to carbon because of the enhanced energy density that silicon has over carbon. A single silicon atom can acquire ~3.5 lithium ions while six carbons can only intercalate a single lithium ion. Micron-scale silicon (i.e. Non-porous silicon) by itself does not work in an LIB. There are a number of reasons that silicon fails, including: (1) the silicon undergoes structural failure or fracturing during lithiation because of a volume increase (the silicon structural volume swells by ~300%); (2) the lithium ion forms a salt precipitate on the anode surface known as a solid electrolyte interphase layer (SEI) layer and each time that occurs lithium ions are lost to the silicon surface; and (3) repeated mechanical swelling and shrinking of the silicon on the anode upon lithiation and de-lithiation can cause the silicon to lose contact with the electrode thus causing battery failure. FIGS. 1A-1B pictorially describes what happens to traditional silicon anode materials in lithium battery applications. FIG. 1A describes a solid silicon structure that is lithiated and subsequently forms a solid electrolyte interphase layer (SEI) on the surface. This SEI is formed due to reaction of the electrolyte and Li-salt used in the electrolyte on the Si surface. A solid silicon particle expands upon lithiation. A thin layer of SEI forms in this lithiated and expanded state. During delithiation, the silicon structures shrink, and the SEI can break down into separate pieces, exposing fresh silicon surface to the electrolyte. With repeated cycles, new SEI is formed on the newly exposed silicon surfaces, resulting in the accumulation of a very thick and unstable SEI layer on the outside of the solid silicon surface. The SEI layer comprises of organic and inorganic lithium salts which represent a loss of active lithium ions.

Similarly, as shown in FIG. 1B, when nanoscale, porous silicon structures are used, a SEI grows outside the silicon because of exposed Si surface.

Because of silicon's advantages, it has the potential to make an anode containing it significantly better than current graphite anodes if the material degradation problems can be overcome. Therefore, there is a continued demand to find a way to use or incorporate silicon into new or alternative structures that have the high dilithiation properties of silicon, but also have the long term stability necessary for a rechargeable battery. Many researcher groups have tried to remedy the problems inherent with silicon by making nanoscale silicon. These groups have found improvement with nanoscale silicon over non-porous micron scale silicon. The reason these groups believe that the reduction in silicon size improve performance is that they think the smaller silicon size helps to manage better the volume expansions that occur for silicon as it associates with lithium ions during cycling. However, these nanoscale silicon efforts are not able to easily scale mass on the anode to make useful commercial devices. Additionally, the means by which they make the material often not scalable or cost effective to compete with the carbon market.

Figure 6:
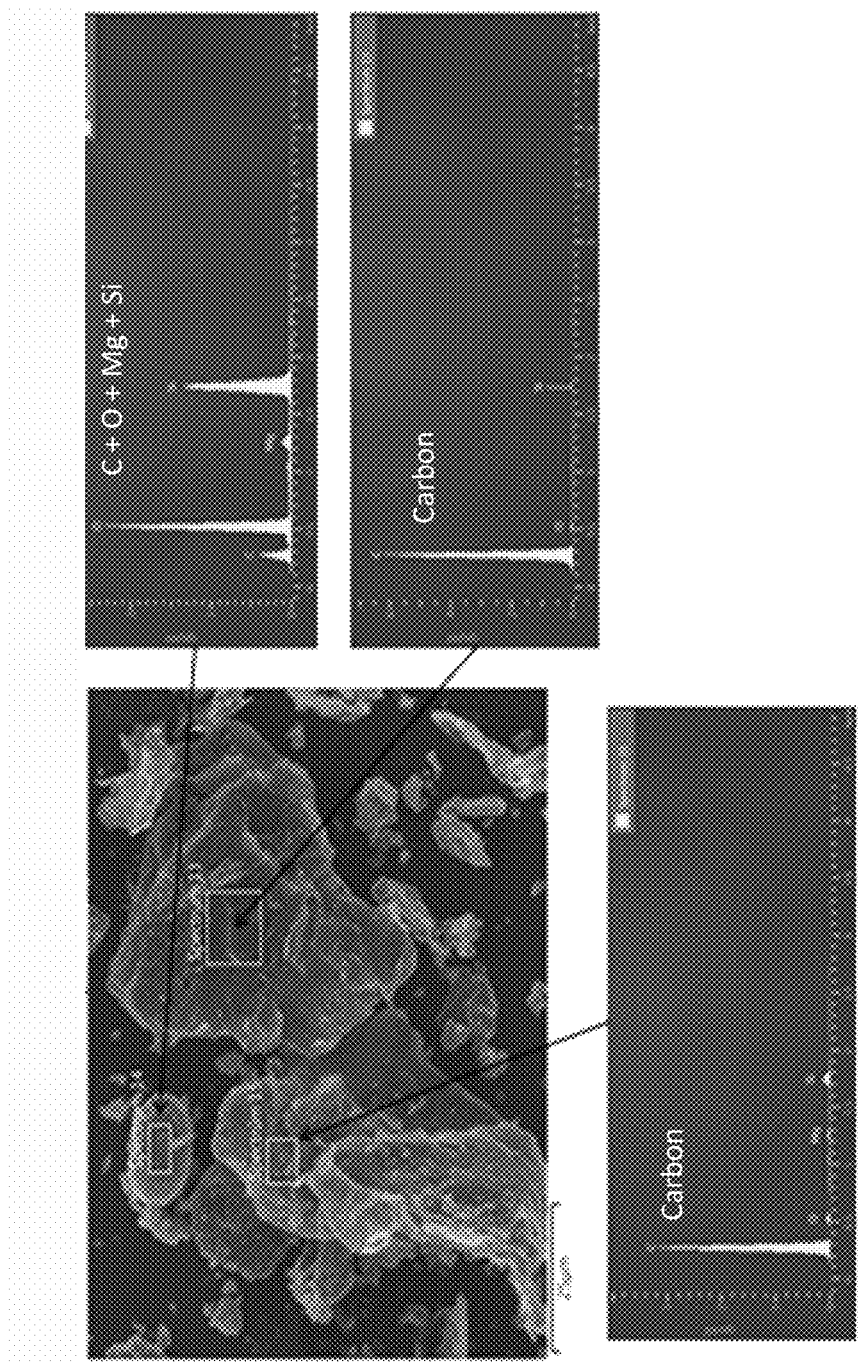
FIG. 6 shows an EDS image of a non-conformal graphene nanoplatelet (25 micron Strem Chemical Inc.) annealed to SPS particle under argon oven conditions. Elemental profile verifies that the external coating is a carbon graphene coating.
Figure 7:
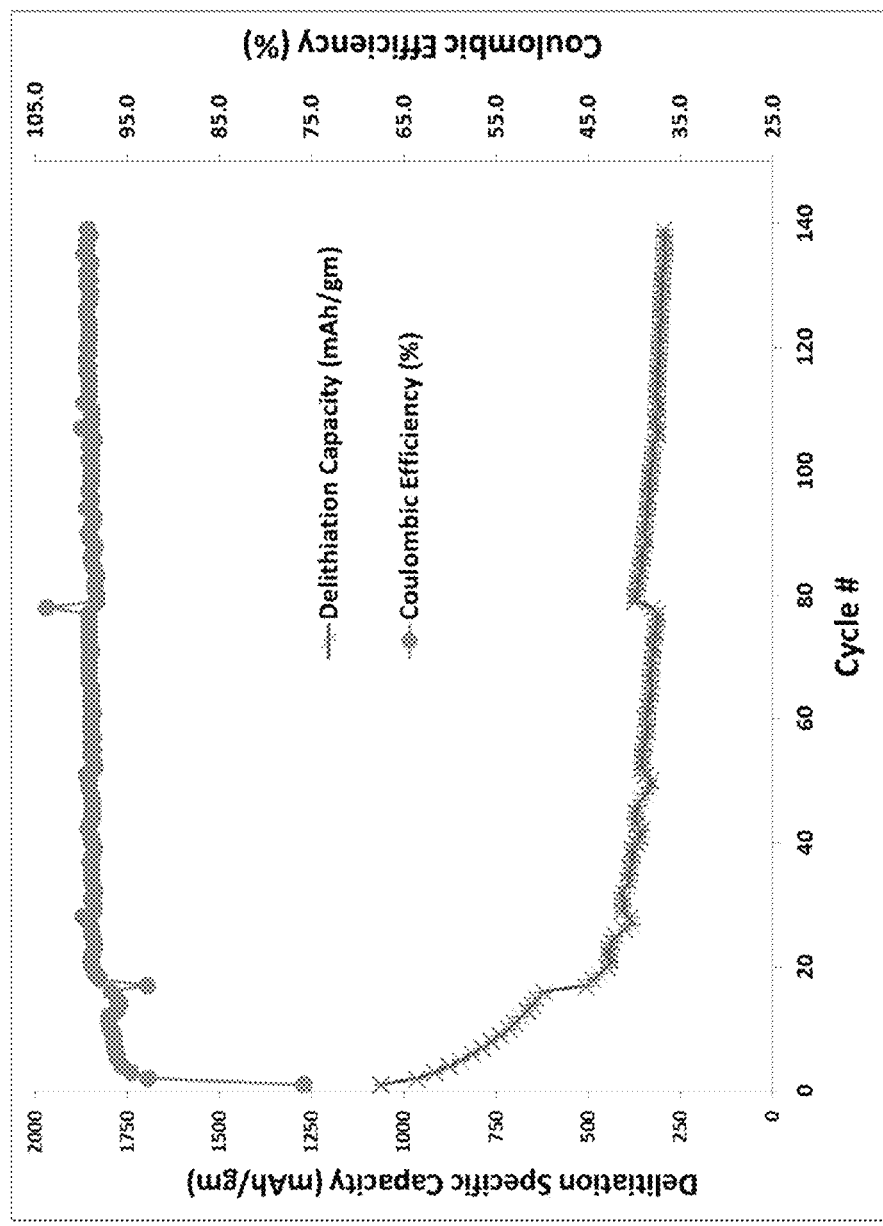
FIG. 7. is the measurement of delithiation specific capacity (mAh/gm) and Coulombic efficiency (CE) (%) as a function of cycle number for the non-conformally coated SPS particles using graphene nanoplatelets that are annealed at 900° C. for 7 hours in an argon oven.
Figure 9B:
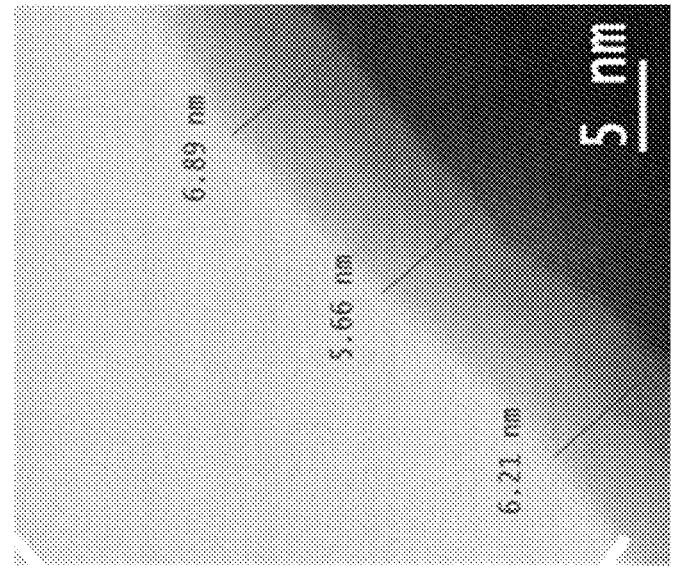
FIGS. 9A and 9B are representative TEM image (FEI Titan ChemiSTEM instrument) of an embodied carbon coating having a thickness between ~4-7 nm on a silicon particle.
Figure 9A:
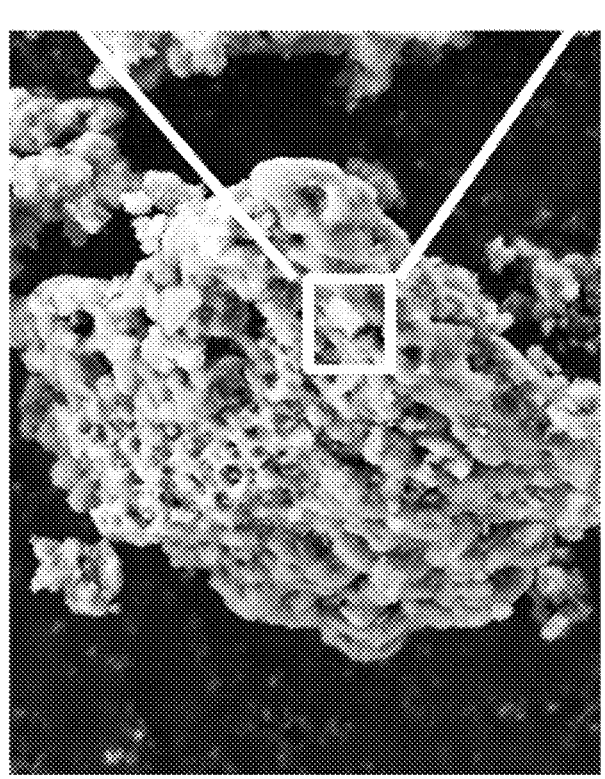
Figure 10A:
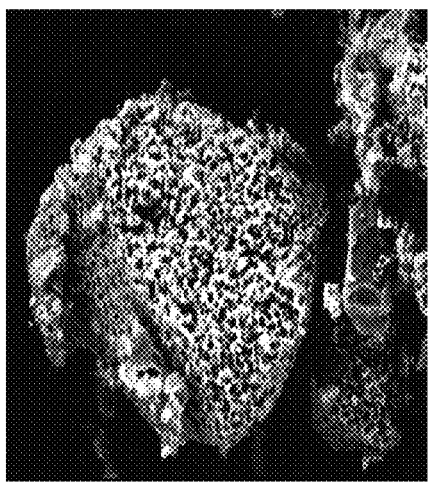
FIGS. 10A-D are scanning electron micrographs at different magnifications of 325 mesh porous silicon conformally coated with amorphous carbon made from sucrose-glucose-sulfuric acid coating doped with graphene oxide and highly conductive multi-walled carbon nanotubes (mw-CNT). Images are collected with a Zeiss 1550VP at 7 kV. Bottom SEM micrographs show close up image of mw-CNT embedded in conformal carbon matrix.
Figure 10B:
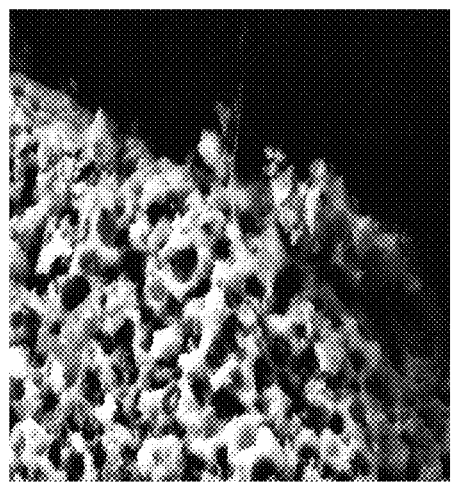
Figure 10C:
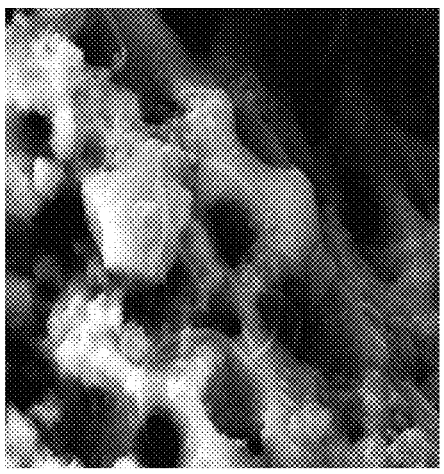
Figure 10D:
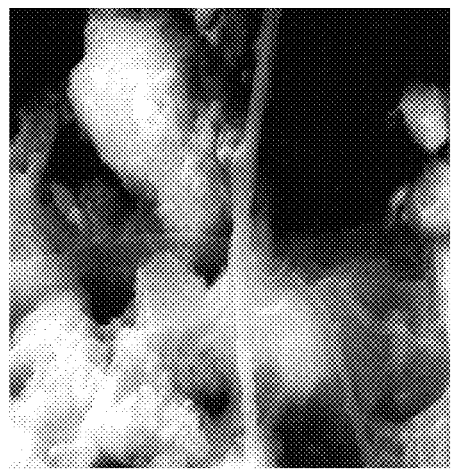

Current embodiments comprise stable porous silicon ("SPS") materials that have micron-scale structure and are readily scalable. The porous silicon material is an attractive alternative to nano-scale silicon because its size is on the micron scale which is ideal for most real world commercial applications yet its porosity allows for swelling management and maximal ease of electrolyte access. In our past work we have shown that porous silicon made from metallothermic reduction of silica particles can be used as an anode material with significantly higher capacity than carbon. Nonetheless, in some embodiments, our bare porous silicon (which we call stable porous silicon (or SPS for short)) while better performing than micron scale non-porous silicon is not fully stabilized "as is." That is to say, in some embodiments, the SPS particles suffer capacity loss early in the process of early cycling. Early solutions directed to strengthening the SPS by loosely annealing a graphene nanoplatelet coating to the SPS exterior proved inadequate. It was determined that simple annealing of graphene nanoplatelets is not adequate to stabilize the SPS fully. FIG. 6 shows an energy dispersive image of an SPS particle that has been loosely annealed to graphene nanoplatelets. The elemental mapping shows that the thinly veiled particles do indeed have a carbon exterior (along with a core comprising silicon, oxygen and small amounts of magnesium. However, as can be seen in FIG. 7 the delithiation specific capacity (mAh/gm) is not stable and rapidly decreases over cycle number. This shows that a simple external film cannot adequately stabilize the damage due to swelling upon lithiation. Current aspects and embodiments described herein provide novel solutions that comprise adhering conformal coatings directly onto the SPS particles to ensure uniform surface stabilization.

A first aspect comprises structures that comprise porous silicon coated with a coating layer to form a composite. The general structure of the composite is a SPS core with a coating conformally adhered to at least part of the surface of the SPS core. Such composites are inexpensive, able to be made on commercial scales, stable over the desired cycle life, and show cycle efficiencies that are up to 250-300% higher than graphite without the stability issues of silicon. The possible precursors for both the SPS and coating are numerous and inexpensive. Three main advantages for having a composite structure are that 1) the conformal coating of the SPS helps minimize SEI layer buildup by modifying the SPS surface, which increases the 1st Coulombic Efficiency (CE) as well as the long term cycling performance; 2) the composite structure minimizes the volume expansion of the Si during electrochemical cycling (lithiation and de-lithiation); and 3) it allows for control the final specific capacity of the anode as needed by the application. FIG. 1C pictorially shows an embodiments of this first aspect. In FIG. 1C, a porous silicon structure is combined with a coating layer that coats or covers at least part of the surface of the silicon. The constraining layer prevents the silicon from expanding during lithiation, as well as protects the bare Si surface, which prevents the repeated formation of SEI layers that results in the buildup of SEI on the anode as shown in FIGS. 1A and 1B.

Embodiments of the composite comprise a porous silicon core with a coating. The porous silicon core structure is described herein as well as in U.S. Appl. Nos. 62/016,897 (filed Jun. 25, 2014) and 61/197,451 (filed Apr. 9, 2014), both of which are hereby incorporated by reference in their entireties. In some embodiments, the SPS or stable porous silicon comprises a silicon-silica hybrid material. The hybrid material comprises regions of silicon oxide, $SiO_x$, where x is from 1 to 2, and regions of silicon, and may be formed by metallothermic reduction processes. The hybrid materials of disclosed herein can be made from silica precursors. Materials that can be used as silica precursors to form the hybrid material generally include any silica-based composition. The silica precursors may comprise pure silica or alternatively, may comprise silica compositions that further comprise dopants or impurities. Particularly useful silica precursors are silica powders and silica soots. Generally, it is advantageous when silica precursor particles or powders are on the order of nanoscale or microscale. In some embodiments, the SPS can also comprise porous silicon in combination with other organic or inorganic elements.

Silica soot particles can have an average size from about 10 nm to about 1 μm when measured along the longest axis and may have any desired shape, such as, for example spheroid or fractal. The silica soots may further comprise dopants or impurities. Examples of dopants or impurities that may be included in the silica precursor are shown in U.S. Appl. Nos. 62/016,897 (filed Jun. 25, 2014) and 61/197,451 (filed Apr. 9, 2014). Dopants that may be advantageous in certain embodiments comprise, for example, Lithium, magnesium, manganese, molybdenum, niobium, tungsten, tantalum, iron, copper, titanium, vanadium, chromium, nickel, cobalt, zirconium, tin, silver, gold, indium or copper, and combinations thereof. In such embodiment, these materials may be present from greater than 0 wt % to about 30 wt %, however typically they are present in amounts less than 10 total combined wt %, or in some cases less than 10 total combined wt %.

Generally, silica soot is made by flame combustion of silica precursors. The precursors can be made by digesting silica particles to synthesize silicon tetrafluoride, silicon tetrachloride, or organosilicon precursors. The particles are then flame hydrolyzed to produce silica soot. The flame combustion process controls the nucleation and growth (coalescence of the molten particles) and size. In soot production, the soot particles are quenched to prevent consolidation and collected in a "bag house." In addition to flame combustion, other methods of making silica soots exist as well, including inductive soot gun, sol gel, and plasma combustion.

Embodiments of hybrid materials formed from silica soots have structures wherein the silicon oxide and silicon are relatively evenly spaced throughout the resulting hybrid material. One advantageous aspect of the hybrid materials is their high porosity levels. While not wanting to be held to any particular theory, it is posited that the high porosity levels (e.g., surface area, pore size) of the hybrid material in combination with the structural interactions of the silicon oxide and silicon regions provides for enhanced structural integrity in the hybrid materials. The hybrid material can have an average pore size from about 50 Å to about 1350 Å. In some embodiments, the average pore size is from about 50 Å to about 1350 Å, about 50 Å to about 1200 Å, about 50 Å to about 1000 Å, about 50 Å to about 800 Å, about 50 Å to about 600 Å, about 50 Å to about 400 Å, about 50 Å to about 200 Å, about 50 Å to about 150 Å, about 50 Å to about 100 Å, about 100 Å to about 1350 Å, about 100 Å to about 1000 Å, about 100 Å to about 800 Å, about 100 Å to about 400 Å, about 100 Å to about 250 Å, about 100 Å to about 200 Å, about 100 Å to about 150 Å, about 150 Å to about 1350 Å, about 150 Å to about 1000 Å, about 150 Å to about 700 Å, about 150 Å to about 250 Å, about 150 Å to about 200 Å, about 200 Å to about 1350 Å, about 200 Å to about 1000 Å, about 200 Å to about 700 Å, or about 200 Å to about 250 Å.

Surface areas in the hybrid materials range from about 10 $m^2/g$ to about 250 $m^2/g$. Embodiments include hybrid materials with surface areas from about 10 $m^2/g$ to about 250 $m^2/g$, 10 $m^2/g$ to about 200 $m^2/g$, 10 $m^2/g$ to about 150 $m^2/g$, 10 $m^2/g$ to about 100 $m^2/g$, 10 $m^2/g$ to about 75 $m^2/g$, 10 $m^2/g$ to about 50 $m^2/g$, 10 $m^2/g$ to about 25 $m^2/g$, 25 $m^2/g$ to about 250 $m^2/g$, 25 $m^2/g$ to about 200 $m^2/g$, 25 $m^2/g$ to about 150 $m^2/g$, 25 $m^2/g$ to about 100 $m^2/g$, 25 $m^2/g$ to about 75 $m^2/g$, 25 $m^2/g$ to about 50 $m^2/g$, 50 $m^2/g$ to about 250 $m^2/g$, 50 $m^2/g$ to about 200 $m^2/g$, 50 $m^2/g$ to about 150 $m^2/g$, 50 $m^2/g$ to about 100 $m^2/g$, 50 $m^2/g$ to about 75 $m^2/g$, The hybrid materials formed from nanoscale soots and powders are generally from about 1 μm to about 10 μm in diameter along their longest axis. In some instances, the particles are roughly spherical with a diameter from about 1 μm to about 10 μm. These materials tend to have an agglomerate structure comprising somewhat homogeneous mixing of regions of $SiO_x$ and silicon. In agglomerates, the agglomerate may be composed of subparticles comprised of silicon and $SiO_x$ that are from about 10 nm to about 500 nm. It is posited that the micron-scale hybrid products' structure is a function of the agglomeration of the nanoscale starting materials. However, while the resulting hybrid materials' shape may be a function of the starting material, it can be modified via chemical or mechanical processes as well.

The hybrid material comprises a combination of silicon and $SiO_x$, wherein x is from 1-2. In some embodiments, the silicon is crystalline. The amount of crystalline silicon in the hybrid material is from about 20 wt % to about 97 wt %. In some embodiments, the amount of crystalline silicon is from about 20 wt % to about 97 wt %, about 20 wt % to about 95 wt %, about 20 wt % to about 90 wt %, about 20 wt % to about 80 wt %, about 20 wt % to about 70 wt %, about 20 wt % to about 60 wt %, about 20 wt % to about 50 wt %, about 20 wt % to about 40 wt %, about 20 wt % to about 30 wt %, about 30 wt % to about 97 wt %, about 30 wt % to about 95 wt %, about 30 wt % to about 90 wt %, about 30 wt % to about 80 wt %, about 30 wt % to about 70 wt %, about 30 wt % to about 60 wt %, about 30 wt % to about 50 wt %, about 30 wt % to about 40 wt %, about 40 wt % to about 97 wt %, about 40 wt % to about 95 wt %, about 40 wt % to about 90 wt %, about 40 wt % to about 80 wt %, about 40 wt % to about 70 wt %, about 40 wt % to about 60 wt %, about 40 wt % to about 50 wt %, about 50 wt % to about 97 wt %, about 50 wt % to about 95 wt %, about 50 wt % to about 90 wt %, about 50 wt % to about 80 wt %, about 50 wt % to about 70 wt %, about 50 wt % to about 60 wt %, about 60 wt % to about 97 wt %, about 60 wt % to about 95 wt %, about 60 wt % to about 90 wt %, about 60 wt % to about 80 wt %, about 60 wt % to about 70 wt %, or about 70 wt % to about 80 wt %.

In some embodiments, the amount of $SiO_x$ is from about 3 wt % to about 50 wt %. In some embodiments, the amount of $SiO_x$ is from about 3 wt % to about 50 wt %, about 3 wt % to about 40 wt %, about 5 wt % to about 30 wt %, about 5 wt % to about 20 wt %, about 5 wt % to about 10 wt %, about 10 wt % to about 50 wt %, about 10 wt % to about 40 wt %, about 10 wt % to about 30 wt %, about 10 wt % to about 20 wt %, about 20 wt % to about 50 wt %, about 20 wt % to about 40 wt %, about 20 wt % to about 30 wt %, about 30 wt % to about 50 wt %, about 30 wt % to about 40 wt %, or about 40 wt % to about 50 wt %.

In certain embodiments, the ratio of silicon to $SiO_x$ is critical to the stability of the material when undergoing multiple volume expansions, such as when used as an anode material in a lithium battery. In these embodiments, the ratio of silicon:$SiO_x$ is from about 1:1 to about 40:1 or about 1:1 to about 35:1. In some embodiments, the ratio of silicon:$SiO_x$ is from about 1.5:1 to about 35:1, about 1.5:1 to about 30:1, about 1.5:1 to about 20:1, about 1.5:1 to about 10:1, about 1.5:1 to about 5:1, about 2:1 to about 35:1, about 2:1 to about 30:1, about 2:1 to about 20:1, about 2:1 to about 20:1, about 3:1 to about 35:1, about 3:1 to about 30:1, about 3:1 to about 20:1, about 5:1 to about 35:1, about 5:1 to about 30:1, or about 5:1 to about 20:1.

The hybrid materials may further comprise additional compounds that either have a limited effect on the material's properties, or may have a positive or synergistic effect. These include dopants, impurities, and products of side reactions from the formation of the hybrid material. For example, some embodiments comprise from greater than 0 wt % to about 25 wt % $Mg_2SiO_4$, also known as Forsterite. Alternatively, some embodiments comprise from greater than 0 wt % to about 45 wt % MgO, or from greater than 0 wt % to about 10 wt % MgO. While MgO can be removed from the hybrid material by, for example, washing the product with an organic acid, residual amounts may remain and do not affect the performance of the hybrid material. Dopants and/or impurities that may be present and advantageous in certain embodiments of the hybrid material comprise lithium, magnesium, manganese, molybdenum, niobium, tungsten, tantalum, iron, copper, titanium, vanadium, chromium, nickel, cobalt, zirconium, tin, silver, indium or copper, and combinations thereof. In such embodiment, these materials may be present from greater than 0 wt % to about 10 wt %, however typically they are present in amounts less than 3 total combined wt %.

Turning to the coating layer, embodiments herein further comprise one or more layers that coat at least part of the SPS material. The coating layer may be only on the surface or outer region of the SPS material or it may intercalate into or coat part or all of the interior of the porous structure. In some embodiments it may intercalate into the regions of agglomeration in the SPS material, but not into the porous structure. FIG. 8 shows a 2D representation of an embodied porous SPS particle before (image on left) and after conformal coating (image on right). In this embodiment, the conformal coatings occur both within the pores as well as outside the SPS particle.

The coating layer may comprise one or more layers of either an organic or inorganic material, or a combination thereof. It is believe that such a bond structure is sufficiently strong enough to "lock" the SPS structure and prevent it from swelling and shrinking during lithiation and delithiation. The structure of the coating layer may comprise an ordered, disordered, amorphous, crystalline, or combination of such structures. For example, the coating layer may comprise an amorphous carbon layer with crystalline inorganic components incorporated. Alternatively, the coating layer may comprises graphene sheets. In some embodiments, the coating layer covers at least about 30%, 40%, 50%, 60%, 70%, 80%, or 90% of the outer surface of the SPS material. In some embodiments, the coating layer comprises a thickness of from about 1 nm to about 5 μm. In some embodiments, the coating layer thickness is from about 2 nm to about 5 μm, about 10 nm to about 3 μm, about 10 nm to about 1 μm, about 10 nm to about 800 nm, about 10 nm to about 500 nm, about 5 nm to about 5 μm, about 5 nm to about 3 μm, about 5 nm to about 1 μm, about 5 nm to about 800 nm, about 80 nm to about 5 μm, about 80 nm to about 3 μm, about 80 nm to about 1 μm, about 1 μm to about 5 μm, about 1 μm to about 3 μm, or about 3 μm to about 5 μm. In some embodiments, the mass ratio of the SPS to the coating material is from about 1000:1 to about 1:10, about 100:1 to about 1:10, about 10:1 to about 1:10, about 8:1 to about 1:8, about 5:1 to about 1:5, or about 2:1 to about 1:2.

In some embodiments, the coating comprises one or more conductive components, such as metals, or conductive oxides. In some embodiments, the coating layer comprises multiple layers, wherein each of the layers may be nonconductive (or insulative), semiconductive, or conductive. Conductivity or semiconductivity may come from the one or more layers of the coating layer itself or from components within the layer, such as metals, oxides, nanomaterials, graphene, etc.

In some embodiments, the coating layer comprises an organic material, such as carbon. Carbon-based coatings are advantageous in that they are inexpensive to make from numerous starting materials and work well within the lithium ion battery. The carbon coating can be made from any of the carbon precursors known in the art. Examples of precursor polymers include polymers (e.g., Poly(hydridocarbyne), polyacrylonitrile, complex sugars, phenolic resins, etc.). Examples of monomeric sugars are glucose, fructose and sucrose, etc., etc. In some embodiments, the carbon is in the form of activated carbon, amorphous carbon, graphene, graphite, mesoporous carbon, diamond-like carbon, nanocrystalline diamond, nanotubes, fullerenes, nanobuds, nanofibers, glassy carbon, and combinations thereof.

Alternatively, the organic coating can comprise organic small molecules or polymers that are chemically bonded to the surface of the SPS material. For example, the coating layer can comprise a polymer, such as PEO epoxy, PEG epoxy, or polyaniline, that is chemically bonded to the —OH groups in the outer silica layer. Commercial conductive epoxy systems like master bond 10HTS that are doped with silver can also be used. A two-step process wherein a first coating is a silane adhesion promoter and is done to enhance adhesion or even promote in situ polymerization of the polymer coating over the SPS.

The precursor polymer can be additionally enhanced for interaction with the SPS particles by using an initial surface treatment like a silane that enhances surface interaction between the precursor polymer and the SPS. One example of a precoating silane would be precoating the SPS with Glycidyl 3-(trimethoxysilyl)propyl ether (GLYMO). Other commercial examples of adhesion promoting coatings are the Tyzor® product line zirconates and titanates. In some embodiments, the coating layer comprises an adhesion promoter or other component to improve the adhesion of the layers. In some embodiments, the adhesion promoter is a first layer prior to additional layers. In some embodiments, the adhesion promoter is a silane. In some embodiments, the silane coating can be used to promote adhesion of a carbon precursor to the SPS, either as a co-coating or as a first coating, to produce a carbon coating with improved adhesion.

Inorganic coatings may comprise any number of inorganic compounds, compositions, or oxides that work with the SPS embodiments herein. Examples include metals, such as gold, silver, aluminum, copper, and other transition metals, oxides, including alumina, tungsten oxide, aluminum zinc oxide, indium tin oxide and other TCOs, and other inorganic materials such as inorganic polymers such as polysilanes. The coating materials may comprise their own coatings or may be combined with organic coating materials to produce a "hybrid" coating. In some embodiments, the organic or carbon coating is "doped" with one or more inorganic materials. In such cases, the dopant may be present from greater than 0 wt % to about 10 wt %, however typically they are present in amounts less than 3 total combined wt %.

The composite materials may be incorporated into anodes for electrochemical devices, especially lithium battery devices. Of particular interest is the use of the composite materials in lithium battery anodes. When the composite materials are used in lithium battery anodes, it is possible to obtain advantageous properties not seen with other materials. For example, anodes comprising composite materials have a specific capacity of about 20% or greater after 100 cycles at a 0.2 discharge rate. In some embodiments, the specific capacity of anodes comprising hybrid materials is about 30% or greater, 40% or greater, 50% or greater 60% or greater, 70% or greater, or 80% or greater after 100 cycles at a 0.2 discharge rate.

In some embodiments, anodes comprising composite materials show improvements in gravimetric capacity. In some embodiments, the gravimetric capacity of anodes comprising composite materials is about 400 mAh/g or greater, about 500 mAh/g or greater, or about 600 mAh/g or greater after 100 cycles at 0.2 C discharge rate. Additionally, such anodes may also show coulombic efficiencies after the first cycle of greater than 15%, 20%, 25%, 30%, 40%, 50%, 60%, 70%, 80% or 90%.

In electrochemical applications, the composite materials may be further combined with additional co-materials, such as carbon or even porogens. Porogens are agents doped into the conformal coating that are later removed to allow pore formation in the final conformal coating. In some embodiments, the combination anodes may comprise from >2-95% carbon and >5-98% composite material. In some embodiments, the carbon is graphite, amorphous carbon, diamond-like carbon, graphene, activated carbon, carbon nanotubes, or fullerenes and combination of above. The composite may be doped or undoped.

Other components used in lithium battery applications are well known to skilled artisans. Lithium compounds that can be used with the composite materials comprise lithium metals, oxides, alloys, binary alloys, etc.

While being of specific interest for use in lithium battery anodes, the composite materials made by the processes described herein can also be used in a wide range of applications such as; molecular sensing, catalysis, molecular sieves, opto-electronics, computing, energy storage, batteries, field electron transmitting (FET) and n-MOSFET or p-MOSFET, drug delivery, anti-microbial uses, cell culture, cell based assays, ion channel assays, organic hybrid polymer composites, inorganic hybrid polymer composites, health care, medicinally, cement, transparent electrical conductors, superconductors, super magnets, piezoelectric, pyroelectric, microwave-synthesis, anti-microbial, anti-cancer, petroleum production and refinement, quantum entanglement, metamaterials, energy, electronics, microelectronics, nanoelectronics, spintronics, chiral synthesis, gas sensing, gas separation, water purification, electrolysis, electrochemical reactions & synthesis, magnetic susceptibility, environmental gas clean up, carbon sequestration, catalytic converters, fiber optical devices, lenses, ion exchange, RFID, LEDs, OLEDs, refractory materials, conductors, computers, quantum computers, integrated circuits, quantum cascade lasers, extruded ceramic devices, missile covers, molecular separation, lighting, explosives, aerospace applications, heat sinks, thermoelectric sensors, thermocouples, pH meters, high temperature refractors, chemical lasers, as targets for mass spectrometry, UV-Vis optics, fluorescent dye cavities, nuclear reactions, transformers, solenoids, non-linear optics, electric motors, photovoltaics, metal removal, electrochemical reactions/synthesis, surfactants, adsorption, adhesives, phonon sensing, lighting, lasers biosensors, optical waveguides, photovoltaics, photo catalysis, electroluminescence, surface enhanced Raman spectroscopy, and the like.

Process

A second aspect comprises methods to make such structures comprising process steps that utilize our earlier processes to obtain superior stable porous silicon anode material for a lithium ion battery in combination with additional coating steps. In some embodiments, the process comprises a two-step process. The first step involves 1) making a milled porous silicon particle of from about 0.5-10 microns and then 2) conformally coating the milled porous silicon at its exterior with a stabilizing surface.

Regarding the first step, U.S. Appl. Nos. 62/016,897 (filed Jun. 25, 2014) and 61/197,451 (filed Apr. 9, 2014), both of which are hereby incorporated by reference, provide details around the synthesis of the SPS materials. In some embodiments, the SPS is formed by use a metallothermic reaction between magnesium powder and silica nanoparticles, particularly silica soot. The precursor silica can be in either the amorphous state, like silica nanospheres from silica soot vapor synthesis, or in a crystalline form such as is found commonly in sand. In the case of sand as the precursor material, milling of the quartz particles to sub-micron size may be required. The method of generating porous silicon involves heating a metallic powder, such as magnesium, and the silica powder in a sealed reaction vessel and heated under an inert environment (e.g., argon) to yield porous silicon powder. A subsequent extraction process is done to remove non-silicon contaminants.

The reaction results in oxygen being extracted from the silica precursor by the metallic gas, such as magnesium, to form a metal-oxygen complex along a surface of the metal or metalloid oxide substrate. Also, in some embodiments, the atmosphere can be designed to favor reduction by having a partial pressure of hydrogen (e.g., 98% argon, 2% $H_2$). To facilitate the oxygen extraction, the inert atmosphere is heated to a reaction temperature, T, which, in the case of many powder or soot precursors, will be between about 400° C. and about 900° C. For example, and not by way of limitation, for soot, a suitable reaction temperature T will be approximately 660° C. and can be maintained for approximately two hours. In some embodiments, the reaction temperature is about 400° C., 425° C., 450° C., 475° C., 500° C., 525° C., 550° C., 575° C., 600° C., 625° C., 650° C., 675° C., 700° C., 725° C., 750° C., 775° C., 800° C., 825° C., 850° C., 875° C., or 900° C. In some embodiments, the reaction temperature is greater than 400° C., 425° C., 450° C., 475° C., 500° C., 525° C., 550° C., 575° C., 600° C., 625° C., 650° C., 675° C., 700° C., 725° C., 750° C., 775° C., 800° C., 825° C., 850° C., 875° C., or 900° C. Reduced reaction temperatures are contemplated for low pressure reaction chambers.

Ramp rates for heating the precursor components to the reaction temperature can have an effect on the resulting structure. It is generally the case that the resulting pore structure in the hybrid materials is larger with faster ramp rates. This result provides for the ability to "tune" the pore structure to the particular device or system via a simple modification of the process parameters. Ramp rates can be set from 0.5° C./min to more than 50° C./min, for example 1, 2, 5, 10, 20, 30, 40, 50, 75, or 100° C./min.

In terms of energy needed for reduction of an oxide, it is possible to use Ellingham diagrams for the materials present in the precursor. Magnesium gas can reduce most of the common oxides (except for CaO, which can be etched later by other means) at reasonably lower temperatures than, for example, carbon gas. Therefore, it is normally the case that a powder or soot made of a multi-component oxide can be extracted via metallothermic reduction using magnesium gas.

It is contemplated that a variety of suitable reduction gases can be utilized without departing from the scope of the present disclosure. For example, and not by way of limitation, it is contemplated that the metallic reducing gas may comprise magnesium, calcium, sodium, rubidium, or combinations thereof. In a simplified, somewhat ideal case, where the metallic gas comprises magnesium, the corresponding stoichiometric reaction with the silica glass substrate is as follows:

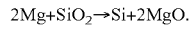

$$2Mg+SiO_2 \rightarrow Si+2MgO.$$

Analogous reactions would characteristic for similar reducing gases. Such reactions may be done on any silica surface. However, silica powders doped or pure may be used. When the precursor particles contain elements other than silicon then the resulting porous material is termed an SPS alloy or SPS intermetallic. When this SPS particle (pure silicon or as an alloy or intermetallic) is then subsequently conformally coated after forming by metallothermic reduction we call this a composite material. We note also here that it is contemplate that the need for subsequent conformal coatings might be possibly mitigated by including the conformal precursor materials like sugars directly in with the silica prior to metallothermic reduction. However, the conformal coatings presented here were done by a second heat treatment in an argon oven.

In non-stoichiometric or more complex cases, reaction byproducts like $Mg_2Si$ are generated and the reducing step described above can be followed by the byproduct removal steps described below. Generally, the application of an strong organic acid in water, alcohol, or polar organic solvent will remove the reaction byproducts. However, in some cases, it may be necessary to sonicate or apply a mixing force to remove byproducts adhered to the hybrid materials. In some cases, it is advantageous to centrifuge the resulting materials to separate out byproducts or to size-separate the actual products. Alternatively, to avoid byproduct generation and the need for the byproduct removal step, it is contemplated that the stoichiometry of the reduction can be tailored such that the metallic gas is provided in an amount that is not sufficient to generate the byproduct. However, in many cases, the composition of the crystalline precursor will be such that the generation of additional reaction byproducts is inevitable, in which case these additional byproducts can be removed by the etching and thermal byproduct removal steps described herein.

To enhance reduction, the powder or soot precursor may be subjected to microwave or RF exposure while reacting with the metallic gas. The metallic gas can be derived from any conventional or yet to be developed source including, for example, a metal source subject to microwave, plasma or laser sublimation, an electrical current, inductive heating, or a plasma arc to induce metal gas formation. In cases where the metallic gas is derived from a metal source, it is contemplated that the composition of the metal source can be varied while reacting the metallic gas with the silica to further enhance reduction.

Additional defects can be formed in the metal or metalloid substrate by irradiating the surface of the substrate with electrons. The resulting defects enable a more facile and extensive extraction of oxygen by the metallothermic reducing gas agent and, as such, can be used to enhance oxygen extraction by subjecting the glass substrate to electron beam irradiation prior to the above-described metallothermic reduction processes. Contemplated dosages include, but are not limited to, dosages from approximately 10 kGy to approximately 75 kGy (kGy is one thousand Gray units), with acceleration voltages of approximately 125 KV. Higher dosages and acceleration voltages are contemplated and deemed likely to be advantageous.

The metal-oxygen complex that is formed may be removed to yield a hybrid structure. The end product may be a silicon-silica hybrid particle with additional, optional dopants present.

Although the various embodiments of the present disclosure are not limited to a particular removal process, it is noted that the metal-oxygen complex can be removed from the surface of the metal or metalloid substrate by executing a post-reaction acid etching step. For example, and not by way of limitation, post-reaction acid etching may be executed in a 1M to 4M HCl solution in water and alcohol (molar HCl (conc.): $H_2O$:EtOH (~100%) ratio=0.66:4.72: 8.88) for at least 2 hours. Alternate alcohols may also be used in the etching step. Depending on the porosity of the glass, some additional MgO may be trapped inside the glass and additional etching may be needed for longer periods of time with multiple flushes of the acidic mixture.

In some embodiments, the formed hybrid material has a porosity of greater than 200 $m^2/g$. In some embodiments, the formed material has a porosity from about 200 to about 1000, about 200 to about 900, about 200 to about 800, about 200 to about 700, about 200 to about 600, about 200 to about 500, about 200 to about 400, about 200 to about 300, about 300 to about 1000, about 300 to about 900, about 300 to about 800, about 300 to about 700, about 300 to about 600, about 300 to about 500, about 300 to about 400, about 400 to about 1000, about 400 to about 900, about 400 to about 800, about 400 to about 700, about 400 to about 600, about 400 to about 500, about 500 to about 1000, about 500 to about 800, about 500 to about 600, about 600 to about 1000, about 500 to about 800, or about 800 to about 1000 $m^2/g$. In some embodiments, the formed material has a porosity of about 200, 225, 250, 275, 300, 350, 400, 450, 500, 550, 600, 650, 700, 750, 800, 900, or 1000 $m^2/g$.

Once the SPS (or hybrid material) has been formed, it may be processed to remove certain by-products—e.g., various Mg-containing components, such as $Mg_2Si$—and then utilized in the second step, wherein the coating layer is incorporated. Coating of the SPS can be done via any number of processes known in the art to form the organic or inorganic coating on the SPS.

In some embodiments, the coating layer is formed via chemical bonding. For example, polymers, such as PAN, PEG, PEO, epoxies, silanes, etc. can be bonded via reaction with the external —OH groups found on the remaining silica. Alternatively, the monomers can be combined in solution with the SPS and polymerized in situ and allowed to coat the SPS (Example 6, below). Still another alternative is to use a silane can be used to as an adhesion layer to improve adhesion of the organic layer.

In some embodiments, the coating layer comprises a carbon coating. In some embodiments, the carbon coating may be formed via a carbonization process. Carbonization involves taking a carbon-containing precursor, coating the SPS, and then thermally treating the combined material at elevated temperatures for a time sufficient to produce a carbon coating. In some embodiments, the thermal treatment step comprises heating to a temperature from about 400° C. to about 1000° C., about 400° C. to about 800° C., about 400° C. to about 600° C., about 400° C. to about 500° C., about 500° C. to about 1000° C., about 500° C. to about 800° C., about 500° C. to about 600° C., about 600° C. to about 1000° C., about 600° C. to about 800° C., or about 800° C. to about 1000° C. In some embodiments, the reaction is done under an inert (e.g., argon, nitrogen) atmosphere. The reaction time is as necessary, and can be from about 30 mins to about 12 hours, about 1 hour to about 8 hours, or about 3 hours to about 6 hours.

Alternatively, the carbon or other coating can be formed via one of the thin film or other deposition techniques known in the art, such as spin coating, plating, chemical solution deposition, chemical vapor deposition, atomic layer deposition, thermal evaporation, sputtering, pulsed laser deposition, electrospray, etc. For example, chemical vapor deposition (CVD) is a well-known process in the art for forming highly pure materials and can be used to coat carbon or inorganic materials on the SPS.

Other processes that may be used to form the coating layer include electrochemical processes, such as electrochemical deposition, electroless deposition, and use of sol gels.

All of these processes for forming the coating layer can be done in multiple iterations to create multiple layers of the same or different coating material and also multiple processes can be used to form multiple layers of the same or different coating material. The ability of processes to be used together and the order in which they could be done without adversely affecting the resulting coating layer is within the scope of one of skill in the art.

Once the coating layer is formed, the composite may be optionally purified or combined with other components and incorporated into devices, such as lithium anodes.

EXAMPLES

Example 1—Method to Conformally Carbon Coat SPS with Sugar Based Carbon Precursor Solution The sugar based coating mix is water based solvent system. In those formulations where graphene is desired as a component in the coated SPS composite graphene oxide is used as the dopant to improve solubility. The base sugar mix is made by dissolving 7 grams of glucose and 14 grams of sucrose into 70 g of water. Then 0.76 mLs of concentrated sulfuric acid (96.4% (w/w) assay=18.1 M) is added to the 70 g of sugar mix to make a final solution of 0.16 M. Graphene oxide in water is added to the sugar mix. The amount of graphene oxide can be varied as necessary. In this example, 2 mL of a 0.2 g/mL suspension is added to the 70.76 mLs of sugar mix to make a ~5 mg/mL coating slurry.

Figure 2A:
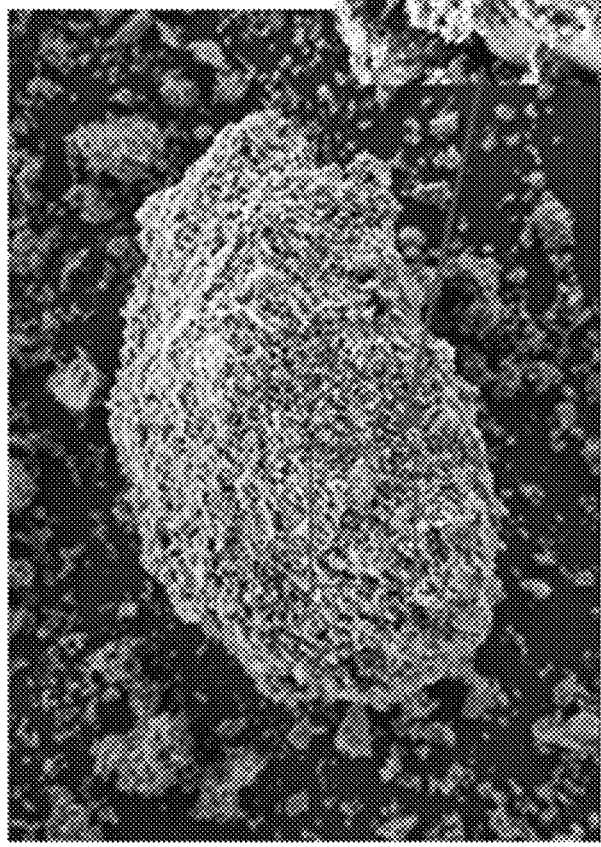
Figure 12B:
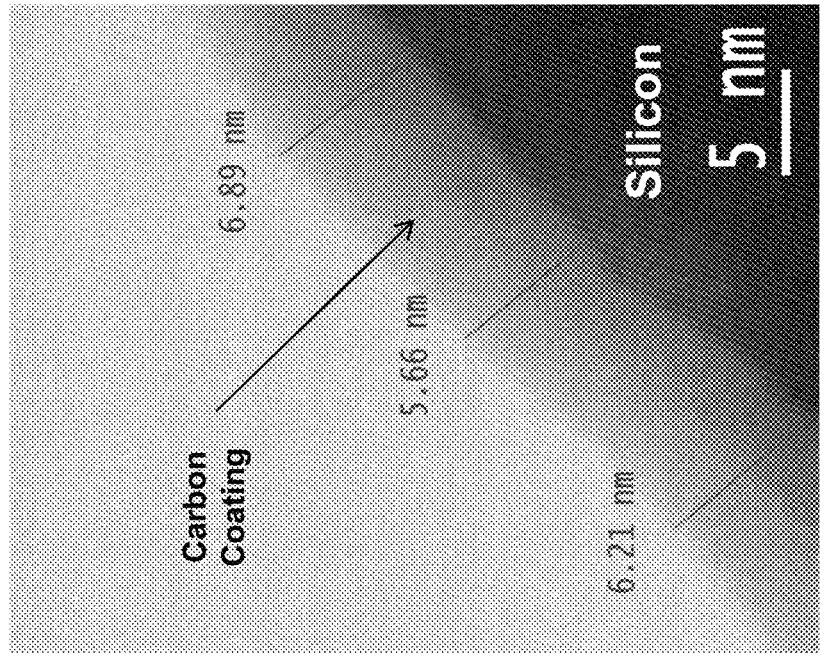
FIGS. 12A-B are representative TEM image at different magnifications of an embodied carbon coating on a nonporous silicon particle having a thickness between ~4-7 nm. The coating was applied to commercial grade 5 µm Si particles to demonstrate the coating thickness when a sucrose-glucose-graphene oxide-sulfuric acid solution is applied and subsequently carbonized in an argon oven.
Figure 12A:
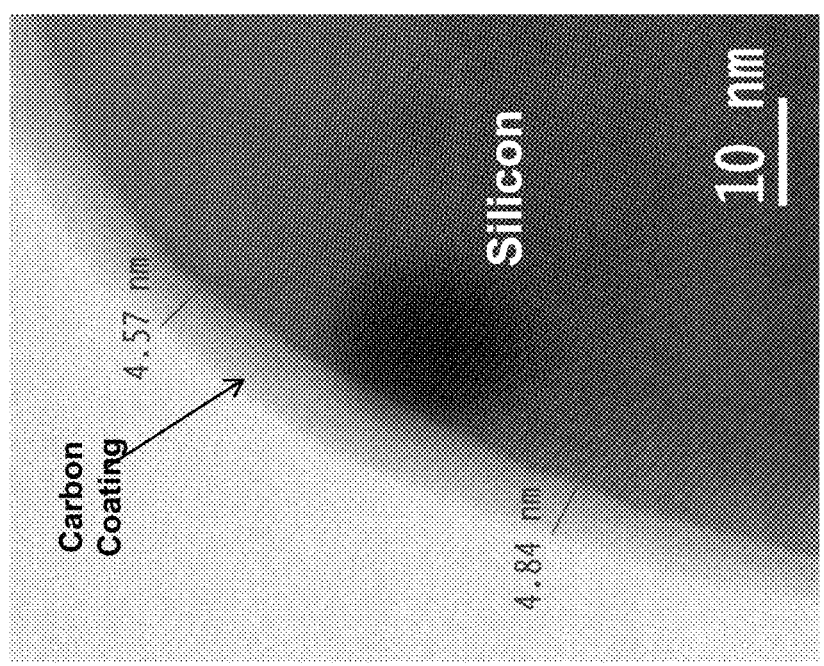

SPS powder (~7 g) is combined with 30 mLs of the sugar slurry. The solution is sonicated for 1 hr, centrifuged for 30 minutes at 5000 RPM, and the pelleted SPS-sugar mix is separated from the supernatant by decanting and disposing of the supernatant. This procedure can be repeated for multiple rounds of coating prior to final carbonization. Once coating is done, the pellet is transferred to a vacuum oven and dried at 80° C. for >4 hours. The pellet is then transferred to a graphite or vitreous carbon crucible and thermally treated for carbonization by heating the closed mixture in an oven under argon atmosphere at 800° C. for ~5 hrs. An SEM micrograph of the conformal carbon coated SPS by sugar precursor method is shown in FIGS. 2A and 2B. Similarly, FIGS. 9A-9B and 12A-12B are TEM images demonstrating the coating thicknesses possible when a sucrose-glucose-graphene oxide-sulfuric acid solution is applied and subsequently carbonized to porous silicon (FIGS. 9A-9B) and commercially available non-porous silicon (FIGS. 12A-12B).

Figure 3:
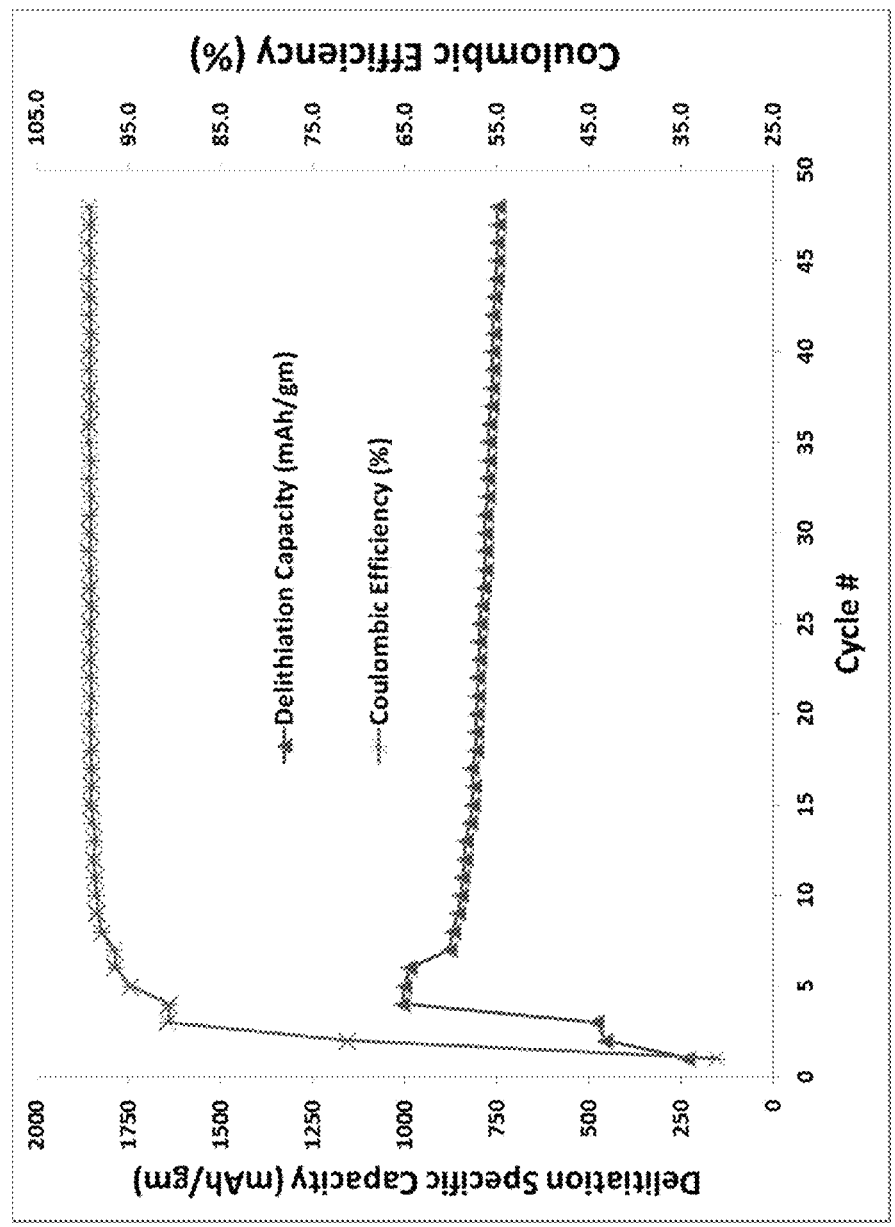
FIG. 3 is the measurement of delithiation specific capacity (mAh/gm) and Coulombic efficiency (CE) (%) as a function of cycle number for the conformally carbon coated SPS particles using a glucose-sucrose-sulfuric acid precursor doped with graphene oxide.
Figure 4A:
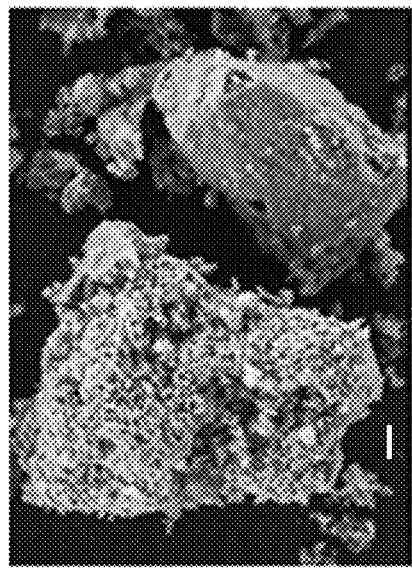
FIGS. 4A-D are Scanning Electron Microscope (SEM) images of conformal carbon coatings on stable porous silicon ("SPS") as made using a polyacrylnitrile ("PAN") based coating.
Figure 4B:
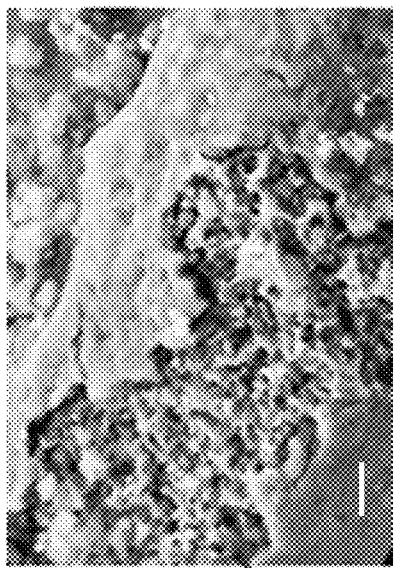
Figure 4C:
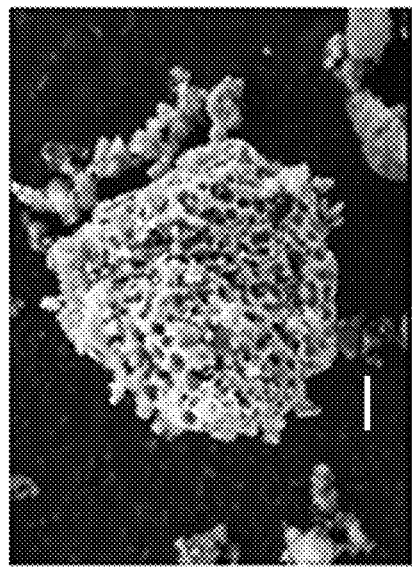
Figure 4D:
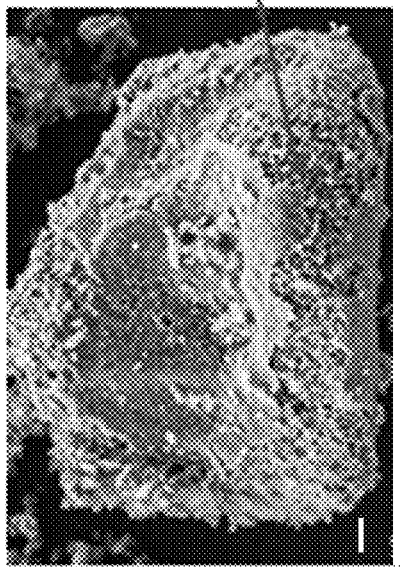

FIG. 3 is a graph of the delithiation specific capacity (mAh/gm) and Coulombic efficiency (CE) (%) as a function of cycle number for the conformally carbon coated SPS particles using a glucose-sucrose-sulfuric acid precursor doped with graphene oxide.

Figure 11:
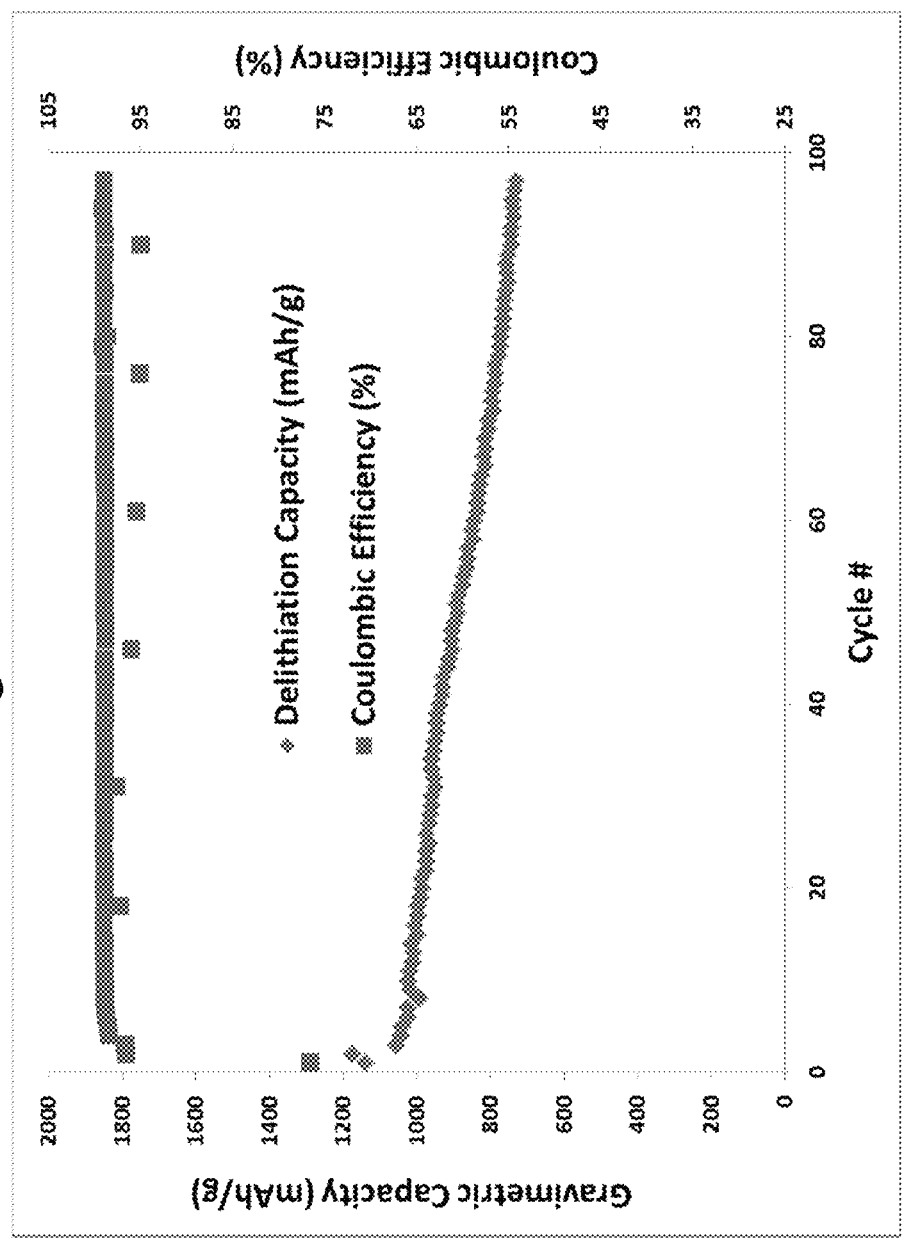
FIG. 11 is a graph showing the measurement of delithiation specific capacity (mAh/g) and Coulombic efficiency (CE) (%) as a function of cycle number for the conformally carbon coated SPS particles using a glucose-sucrose-sulfuric acid precursor doped with graphene oxide and carbon nanotube.

The physical doping process by weight allows for control of the exact amount and ratio of dopant relative to porous silicon powder. Furthermore, doping the base sugar matrix also allows one the ability to combine two or more agents for an additive or combined physical attribute. For example, the glucose-sucrose-sulfuric acid solution can be doped with graphene oxide as well as with highly conductive carbon nanotubes (multi-walled or single walled). In this way one can also control the ratio of dopants relative to porous silicon. For example, FIGS. 10A-D are micrographs of a porous silicon microparticle that is externally coated with multiwalled carbon nanotubes as well as graphene oxide. At the magnification in FIGS. 10C and 10D, the carbon coating and multi-walled carbon nanotubes (long, wire-like structures) are clearly visible. FIG. 11 shows the electrochemical cycling data for an embodied graphene-carbon nanotube-amorphous carbon coated SPS.

Example 2—Method to Conformally Carbon Coat SPS with Polyacrylonitrile (PAN) Based Carbon Precursor Solution Polyacrylonitrile (Sigma Aldrich 181315-100G, avg. MW 150,000 Da) in DMF is used as a precursor solution. In the case where graphene is required, the DMF solvent can be used if graphene is suspended in the solvent prior to dissolving the polymer. 7 g of the SPS particles are combined with 30 mLs of 2% PAN (w/w) in DMF. The PAN solution can be doped with an amount of graphene. (Graphene can be easily introduced into DMF by exfoliation—briefly, 1 mg of graphite is added to a 30 mL solution of DMF and sonicated for 6 hours. The graphene in DMF is obtained by centrifugation. Typically graphene will not pellet out of DMF at a speed of 5,000 RPM and so using this speed to separate the non-graphene from the larger flakes is acceptable. The supernatant will contain the graphene in DMF).

The SPS combined with the 2% PAN solution is sonicated for 30 minutes. Then the solution is centrifuged at 5000 RPM for 30 minutes. The supernatant is discarded and the PAN/SPS pellets are dried in a vacuum oven at 80° C. for five hours. The dry powder is then transferred to a graphite crucible and thermally carbonized at 800° C. for 5 hours in an argon oven. An SEM micrograph showing the conformal carbon coated SPS by 2% polyacrylonitrile (PAN) precursor method is shown in FIGS. 4A-4D.

Figure 5:
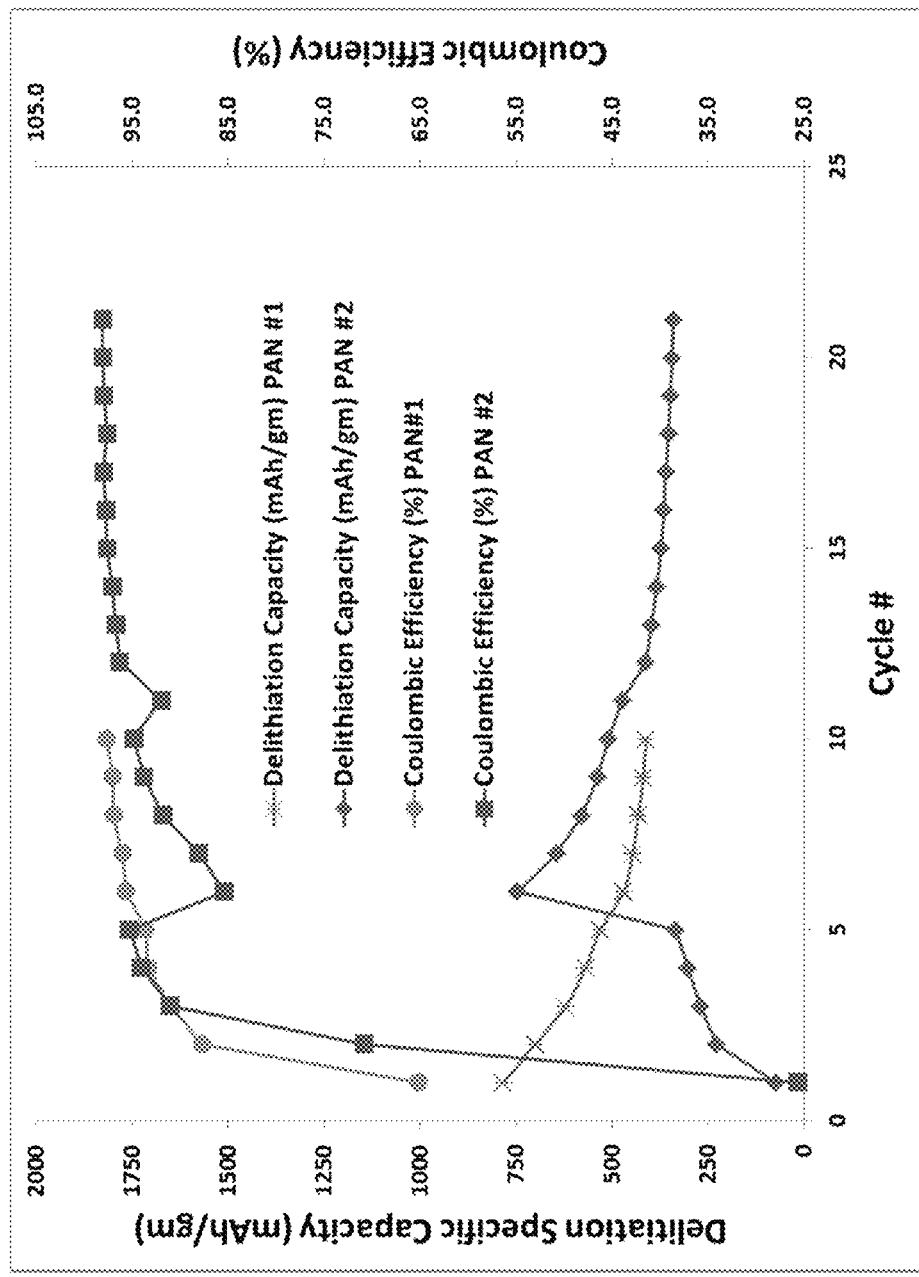
FIG. 5 is the measurement of delithiation specific capacity (mAh/gm) and Coulombic efficiency (CE) (%) as a function of cycle number for the conformally carbon coated SPS particles using a polyacrylonitrile precursor doped with graphene.

FIG. 5 is a graph showing the measurement of delithiation specific capacity (mAh/gm) and Coulombic efficiency (CE) (%) as a function of cycle number for the conformally carbon coated SPS particles using a polyacrylonitrile precursor doped with graphene.

Example 3—Method to Conformally Coat SPS with an Inorganic Oxide Film Using a Sol Gel Solution The inorganic oxide film is made using a precursor solution that has an organic solvent base. Sol gels can use a water:alcohol: catalyst (acid or base) solvent system or they can use a pure organic solvent system. An example of a pure organic system would be dimethylformamide (DMF) or N-methylpyrrolidone (NMP). In the case where graphene is required the DMF or NMP sol gel solvent system would be ideal because graphene is easily suspended into these DMF or NMP solvents. The DMF-sol gel system is able to dissolve many metal salts, metal halide salts, organometallic salts and many salts in general. Alternatively, the ability to combine the polar aprotic solvent systems with alcohol solvents exists and can also be considered as viable sol gel coating methods. Moreover sol gel systems with blends of alcohol and polar aprotic solvents can be used. The sol gel processes described herein provide a general technique for yielding a conformal oxide coating. In other words, nearly any oxide can be conformally coated onto the SPS particles. Conductive oxides like aluminum zinc oxide or tungsten oxide can be made as conformal coatings over and within the SPS particles. Non-conducting oxides can also be made as conformal coatings over and within the SPS particles. Examples would include zirconia, alumina, titania, spinel, silica and the like. Note also that the sol gel coating can include structurally stabilizing agents like graphene or carbon nanotubes.

The following procedure makes a coating less than about 50 nm thick on SPS powder. 7 g of the SPS particles are combined with 30 mLs of a 0.1 M to 1 M solution of aluminum hexahydrate chloride $AlCl_3 \cdot 6H_2O$ in DMF. The SPS powder in aluminum chloride: DMF solution is sonicated for at least 30 minutes. Again for combined graphene with aluminum oxide ($Al_2O_3$) coatings the DMF sol gel solution can be doped with an amount of graphene. The SPS is combined with the 1 M aluminum chloride sol gel solution and then centrifuged at 5000 RPM for 30 minutes. The aluminum chloride DMF supernatant is discarded and the aluminum chloride sol gel SPS pellet is then dried in a vacuum oven at 80° C. for about five hours. The dry powder is then transferred to an oven and further thermally treated at ~500° C. in an argon atmosphere. The resulting $Al_2O_3$ coated SPS particles can be optionally milled into coated particles ready for electrode slurry making.

As an alternative, to make a nitride coating using the same sol gel technique a primary amine chemical like urea is added into the DMF metal salt sol gel. The material is then thermally treated in a nitriding atmosphere, like 10% ammonia gas, in nitrogen with a temperature of >700° C.

Example 4—Method to Conformally Coat SPS with an Inorganic Oxide Film Using Atomic Layer Deposition (Prospective)

Alumina can be coated onto the SPS via atomic layer deposition (ALD) to yield a thinly coated alumina silicon anode for LIB. In some embodiments, it is possible to use less than 10 cycles of ALD to locate a very thin (less than 1 nm thick) $Al_2O_3$ film onto the SPS.

Example 5—Method to Conformally Coat SPS with a Conducting Metal Film Using Electroless Coating (Prospective)

Electroless coating of SPS can be done with metals, such as silver or gold. The electroless coating can be done over a carbonized SPS particle as a way of obtaining a very stable particle with a conductive outer coat. For example, 0.15 mmol $AgNO_3$ is dissolved in 50 mL distilled water in a beaker. Aqueous ammonia (25.0% in $H_2O$) is added dropwise to an $AgNO_3$ solution, until a clear colorless solution is obtained. The pH of the solution is controlled at 9.3. Subsequently, the SPS silicon (0.2 g) is added into the obtained ammonia/$AgNO_3$ solution with agitated stirring for 30 minutes. Formaldehyde (2%, 0.12 mL) is then added dropwise to the solution, followed by agitated stirring for 2 h at room temperature. Finally, the sample is washed with distilled water and desiccated in a vacuum oven at 60° C. for 12 h. The weight ratio of Ag and Si powder is controlled to be about 8:92.

Example 6—Method to Conformally Coat SPS with a Conducting Polyaniline (cPANI)

About 7 grams of SPS are added to a solution containing 200 mg aniline and 10 mL sulfuric acid (1 M). Then 0.5 grams of ammonium persulphate (APS) in 30 ml water is added drop wise with vigorous stirring under a nitrogen flow at 0° C. After stirring at 0° C. for 24 hours, the polyaniline coated SPS particles are collected by centrifugation and dried under vacuum overnight. The resulting particles comprise a porous silicon core with a conductive polymeric coating.

Example 7—Tap Density Measurements of Samples

Table 1 shows the BET, BJH and tap density data measuring the porosity and density values for three different preps of porous silicon before and after coating with carbon using a carbonized sugar-acid coating. The sample labels 1-S, 2-S, and 3-S represent the three different stable porous silicon (SPS) preps from metallothermic reduction. The sample labels 1-CS, 2-CS, and 3-CS all represent the conformal carbon coated porous silicon preps. Note that in all cases the BET values decrease when the porous silicon is coated with the amorphous carbon. Moreover the tap density is elevated for all three carbon coated porous silicon preparations.

TABLE 1

| Sample ID | | 1-S | 1-CS | 2-S | 2-CS | 3-S | 3-CS |
|---|---|---|---|---|---|---|---|
| Particle size (µm) | $d_{10}$ | 2.49 | 3.8 | 0.4 | 1.0 | 0.3 | 0.7 |
| | $d_{50}$ | 10.7 | 10.9 | 2.2 | 6.3 | 1.7 | 4.9 |
| | $d_{90}$ | 29.7 | 25.9 | 8.4 | 21.8 | 9.6 | 20.9 |

TABLE 1-continued

| Sample ID | 1-S | 1-CS | 2-S | 2-CS | 3-S | 3-CS |
|---|---|---|---|---|---|---|
| BET (m²/g) | 213 | 115 | 62 | 38 | 129 | 45 |
| BJH pore surf. area (m²/g) | 180 | 60 | 9 | 22 | 54 | 18 |
| BJH avg. pore diameter (Å) | 66 | 87 | 157 | 59 | 70 | 74 |
| Tap density (g/mL) | 0.24 | 0.64 | 0.68 | 0.83 | 0.4 | 0.75 |
| Ref. tap density | Commercial 5 µm Si: 0.68 g/mL | | | Commercial nano-Si: 0.07 g/mL | | |

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

We claim:

1. A composite material comprising a core material and a coating material coating at least part of the outer surface of the core material, the core material comprising:
   an outer surface and a porous core,
      wherein the porous core of the core material has average pore size of from about 50 to about 1350 Å; and
   particles having a surface area of from about 10 m²/g to about 250 m²/g;
   wherein the core material comprises:
      $SiO_x$, wherein x is from 1-2, from about 3 wt % to about 40 wt %;
      crystalline silicon from about 20 wt % to about 97 wt %;
         wherein the ratio of crystalline silicon:$SiO_x$ is from about 1:1 to about 35:1; and
         the core material further comprises from greater than 0 wt % to about 25 wt % crystalline $Mg_2SiO_4$.

2. The composite material of claim 1, wherein the core material further comprises from greater than 0 wt % to about 45 wt % MgO.

3. The composite material of claim 2, wherein the core material further comprises from greater than 0 wt % to about 10 wt % MgO.

4. The composite material of claim 1, wherein the particles of the core material have an average diameter along the longest axis of from about 1 µm to about 10 µm.

5. The composite material of claim 1, wherein the particles of the core material are in the form of sintered porous particles comprising subparticles comprising $SiO_x$ and crystalline silicon.

6. The composite material of claim 5, wherein the subparticles have an average size along the longest axis of from about 10 nm to about 500 nm.

7. The composite material of claim 1, wherein the core material comprises from greater than 0 wt % to about 10 wt % MgO, and the core material is in the form of particles with an average diameter along the longest axis of from about 1 µm to about 10 µm, and wherein the coating material comprises a carbon-containing material.

8. The composite material of claim 1, wherein the coating material coats less than 80% of the surface area of porous core of the core material and coats at least about 40% of the outer surface of the core material.

9. The composite material of claim 1, wherein the coating material comprises an organic material.

10. The composite material of claim 9, wherein the organic material comprises an organic coating chemically bonded to the core material, for example, a polymer, such as PEO epoxy, PEG epoxy, or polyaniline.

11. The composite material of claim 9, wherein the organic material comprises carbon in the form of activated carbon, amorphous carbon, graphene, graphite, mesoporous carbon, diamond-like carbon, nanocrystalline diamond, single or multiwalled nanotubes, fullerenes, nanobuds, nanofibers, glassy carbon, and combinations thereof.

12. The composition of claim 11, further comprising an inorganic material present from greater than 0 wt % to about 10 wt %, however typically they are present in amounts less than 0.3 total combined wt %.

13. The composite material of claim 1, further comprising a pre-coating material that improves adhesion of the coating material.

14. The composite material of claim 1, wherein the coating material comprises an inorganic material, for example, gold, silver, aluminum, copper, and other transition metals, oxides, including alumina, tungsten oxide, aluminum zinc oxide, indium tin oxide and other TCOs, and other inorganic materials such as inorganic polymers such as polysilanes.

15. The composite material of claim 1, wherein the coating material has a thickness from about 1 nm to about 5 µm.

16. The composite material of claim 15, wherein the mass ratio of the core material to the coating material is from about 1000:1 to about 1:5.

17. The composite material of claim 1, wherein the coating material is conductive or semiconductive.

18. An anode comprising the composite material of claim 1, wherein the anode has a specific capacity of about 20% of the initial value or greater after 100 cycles at 0.2 C discharge rate.

19. An anode comprising the composite material of claim 1, wherein the anode has a gravimetric capacity of 400 mAh/g or greater after 100 cycles at a 0.2 C discharge rate.

20. The anode of claim 19, wherein the anode has a first cycle coulombic efficiency of 45% of the initial value or greater.

21. The anode of claim 18, wherein the anode further comprises carbon.

22. The anode of claim 21, wherein the carbon is in the form of graphite, activated carbon, or carbon nanotubes.

23. A method of making the material of claim 1, wherein the method comprises:
   a. subjecting a silica precursor to a metallothermic process;
   b. removing reaction by-products to give a $SiO_x$-silicon core material;
   c. subjecting the core material to a coating material.

24. The method of claim 23, wherein the subjecting a silica precursor to a metallothermic process comprises heating the silica precursor to a temperature of greater than 400° C. for more than 2 hours while in the presence of magnesium.

25. The method of claim 24, wherein the subjecting comprises heating to a temperature of greater than 400° C. for more than 2 hours and subsequently, heating to a temperature of greater than 600° C. for more than 2 hours.

26. The method of claim 23, wherein the silica precursor comprises a glass soot, glass powder or glass fiber.

27. The method of claim 26, wherein the silica precursor comprises a glass soot or glass powder having an average size along the longest axis of from about 10 nm to about 1 μm.

28. The method of claim 23, wherein the coating material comprises an organic material.

29. The method of claim 28, wherein the organic material is chemically bonded to the core material.

30. The method of claim 28, wherein the coating material comprises a carbon precursor.

31. The method of claim 28, wherein the coating further comprises an inorganic material present from greater than 0 wt % to about 10 wt %, however typically they are present in amounts less than 3 total combined wt %.

32. The method of claim 28, further comprising the step of pre-coating the core material with a material that improves adhesion of the coating material.

33. The method of claim 23, wherein the coating material comprises an inorganic material, for example, gold, silver, aluminum, copper, and other transition metals, oxides, including alumina, tungsten oxide, aluminum zinc oxide, indium tin oxide and other TCOs, and other inorganic materials such as inorganic polymers such as polysilanes.

34. The method of claim 23, wherein the coating material has a thickness from about 1 nm to about 5 μm.

35. The method of claim 23, wherein the mass ratio of the core material to the coating material is from about 1000:1 to about 1:2.

36. The method of claim 23, wherein the coating material is conductive, or semiconductive.

37. A method of making the material of claim 1, wherein the method comprises:

a. combining a silica precursor and magnesium in a ratio of from about 0.5:1 to about 2:1 to form a mixture;
    b. heating the mixture to a temperature greater than about 650° C. and less than 1000° C.; wherein the heating is done at a ramp rate from about 0.5 C°/min to about 50° C./min to form a core material; and
    c. coating the core material with a carbon precursor and heating the core material and carbon precursor to a temperature sufficient to carbonize the carbon precursor.

38. The method of claim 37, further comprising removing reaction by-products of step b. by acid etching the silica-silicon hybrid with an organic acid having a concentration of from about 0.3 M or greater.

39. The method of claim 37, wherein the heating in step c. comprises heating to a temperature greater than 600° C.

40. The composition of claim 1, wherein the porous core of the core material has average pore size of from about 50 to about 250 Å.

41. The composition of claim 1, wherein the particles having a surface area of from about 10 m$^2$/g to about 200 m$^2$/g.

42. The composition of claim 1, wherein the core material comprises
    $SiO_x$, wherein x is from 1-2, from about 3 wt % to about 30 wt %; and
    crystalline silicon from about 70 wt % to about 97 wt %.

43. The composition of claim 1, wherein the ratio of crystalline silicon:$SiO_x$ is from about 2:1 to about 35:1.

44. The composition of claim 1, wherein the coating material comprises an amorphous carbon coating comprising graphene and carbon nanotubes.

\* \* \* \* \*

UNITED STATES PATENT AND TRADEMARK OFFICE
CERTIFICATE OF CORRECTION

PATENT NO. : 9,917,299 B2
APPLICATION NO. : 15/528978
DATED : March 13, 2018
INVENTOR(S) : Francis Martin Behan et al.

It is certified that error appears in the above-identified patent and that said Letters Patent is hereby corrected as shown below:

On the Title Page

In Column 2, item (57), Abstract, Lines 5-6, delete "dilithiation" and insert -- delithiation --, therefor.

On page 2, in Column 2, item (56), other publications, Line 4, delete "SiO x/Si/C" and insert -- $SiO_x/Si/C$ --, therefor.

Signed and Sealed this
Nineteenth Day of May, 2020

Andrei Iancu
*Director of the United States Patent and Trademark Office*